United States Patent
Rhelimi et al.

(10) Patent No.: US 8,804,482 B2
(45) Date of Patent: Aug. 12, 2014

(54) BIDIRECTIONAL COMMUNICATION

(75) Inventors: Alain Rhelimi, Meudon (FR); Robert Leydier, Meudon (FR)

(73) Assignee: Gemalto SA, Meudon (FR)

( * ) Notice: Subject to any disclaimer, the term of this patent is extended or adjusted under 35 U.S.C. 154(b) by 1376 days.

(21) Appl. No.: 11/571,466

(22) PCT Filed: Jul. 1, 2005

(86) PCT No.: PCT/IB2005/001973
§ 371 (c)(1),
(2), (4) Date: Aug. 21, 2007

(87) PCT Pub. No.: WO2006/043130
PCT Pub. Date: Apr. 27, 2006

(65) Prior Publication Data
US 2008/0049606 A1 Feb. 28, 2008

(30) Foreign Application Priority Data

Jul. 28, 2004 (EP) .................................... 04291927

(51) Int. Cl.
*H04J 7/00* (2006.01)
*H04L 25/49* (2006.01)
*H04L 25/02* (2006.01)
*H04L 5/14* (2006.01)

(52) U.S. Cl.
CPC ............ *H04L 25/4902* (2013.01); *H04L 25/02* (2013.01); *H04L 25/4906* (2013.01); *H04L 5/1423* (2013.01)
USPC .......................................... 370/212; 370/282

(58) Field of Classification Search
None
See application file for complete search history.

(56) References Cited

U.S. PATENT DOCUMENTS

| 3,618,039 | A  | * | 11/1971 | Baltzly et al. ...................... 710/1 |
| 6,625,551 | B1 | * | 9/2003  | Gies et al. ....................... 702/58 |
| 6,744,820 | B1 | * | 6/2004  | Khairallah et al. ............ 375/257 |
| 7,259,474 | B2 | * | 8/2007  | Blanc .............................. 307/45 |
| 7,415,027 | B2 | * | 8/2008  | Wishneusky ............ 370/395.31 |
| 2004/0232864 | A1 | * | 11/2004 | Sunaga et al. ................. 318/434 |
| 2005/0015473 | A1 | * | 1/2005  | Teowee et al. ................ 709/223 |

FOREIGN PATENT DOCUMENTS

| DE | 4201468 A1 | 7/1992 |
| EP | 0406718 A2 | 1/1991 |
| EP | 0586716 A1 | 2/1994 |
| EP | 0798901 A1 | 10/1997 |
| WO | 01/30029 A2 | 4/2001 |
| WO | 2005/015816 A1 | 2/2005 |

OTHER PUBLICATIONS

PCT/IB2005/001973 International Search Report, Oct. 7, 2005, European Patent Office, P.B. 5818 Patentlaan 2 NL-2280 HV Rijswijk.
PCT/IB2005/001973 Written Opinion of the International Searching Authority, Oct. 7, 2005, European Patent Office, P.B. 5818 Patentlaan 2 NL-2280 HV Rijswijk.

* cited by examiner

*Primary Examiner* — Rhonda Murphy
(74) *Attorney, Agent, or Firm* — The Jansson Firm; Pehr B. Jansson

(57) ABSTRACT

A two-way communication device has a master transmitter (SysM1, TRM1, SysM2, TRM2) connected to at least one slave transmitter (SysS1, TRS1, SysS2, TRS2) by an active connection wire. The master transmitter and the slave transmitter have a common reference (GND). The master transmitter can transmit a master signal (S1) to the slave transmitter and the slave transmitter can transmit a slave signal (S2) to the master transmitter.
The master signal (S1) is a digital modulation in voltage.
The slave signal (S2) is a digital modulation in current.

29 Claims, 20 Drawing Sheets

BIDIRECTIONAL COMMUNICATION

BACKGROUND OF THE INVENTION

1. Field of the Invention

The invention concerns a device and method for two-way, simultaneous digital communication between a "master" transmitter and at least one "slave" transmitter, connected by an active connection wire (a transmitter being defined as an emitter/receiver pair).

One application of the communication device and method concerns the interfacing between at least two devices via a single connector (for example, an electronic key and an electronic lock).

2. Description of the Related Art

Numerous techniques enabling several electronic systems to communicate exist. The choice of a particular technique depends on the technical constraints of the environment, for example: transmission speed, distance between the systems, electrical power available for the transmission means, communication medium (radio, infrared, wire, etc.) and their characteristics (shielded cable, optical fibre, etc.).

The U.S. Pat. Nos. 5,619,066 and 5,517,015 describe communication devices and methods on a single wire between a master system (host) and a slave system (module).

Another known communication method is "half duplex" communication. The master system transmits energy and information to a slave system. The slave system accumulates data and energy. The slave system transmits its information to the master system using the energy previously accumulated.

These solutions present disadvantages, especially regarding the serious limitations concerning the power transmitted and costs. The energy recovered from the signal sent by the master system (host) is in fact stored in a capacitor. The use of a high-value capacitor (several nanofarads) is expensive on an integrated circuit. In addition, use of a capacitor is accompanied by residual ripple, incompatible with digital technology.

Lastly, another known communication device such as the telephone can be used for two-way, simultaneous data transmission and energy transmission. Continuous polarisation of the telephone line supplies power to the user's telephone set remotely. The combination of the upline signals (from the public network to the user's telephone set) and downline signals (from the user's telephone set to the public network) forms a composite voltage signal. The downline or upline signal, respectively, can be generated by knowing the composite signal and one of the two signals, upline or downline.

SUMMARY OF THE INVENTION

Throughout the following description, a transmitter is taken to mean an emitter/receiver pair.

One objective of the invention is to propose a device and method for two-way, simultaneous digital communication between a master transmitter and at least one slave transmitter, connected by an active connection wire, which does not have the disadvantages of the prior art, in particular which does not require an energy storage device such as a capacitor.

According to the invention, this objective is reached by a device and method for two-way, simultaneous digital communication based on the use of two different physical and electrical quantities, i.e. a voltage and an electric current.

The master signal (S1) transmitted by the master transmitter to the slave transmitter is a digital modulation (logic 0 or 1) in voltage (VCL). The slave signal (S2) transmitted by the slave transmitter to the master transmitter is a digital modulation (logic 0 or 1) in current (ICL).

According to a first mode of realisation of the invention, the digital information contained in the master signal S1 includes an initialisation signal, a synchronisation signal and data.

According to a second mode of realisation of the invention, the master signal also includes the energy transport.

The following table shows the various digital modulation values in voltage VCL and in current ICL:

|          |   | S1 (VCL)      |           |
|----------|---|---------------|-----------|
|          |   | 0             | 1         |
| S2 (ICL) | 0 | 0 mA/0 V      | 0 mA/X V  |
|          | 1 | Not defined   | Y mA/X V  |

When the master transmitter transmits a master signal S1 corresponding by convention to a logic 1 i.e. X volts, the slave transmitter can consume a current of Y mA corresponding by convention to a logic 1, or not consume current, which corresponds to a logic 0.

Consequently, whenever the master transmitter transmits a master signal S1 corresponding to a logic 1 or X volts, the slave transmitter can transmit a slave signal S2. Suitable encoding of the master signal S1 will enable a transmission clock and data to be transmitted in full duplex mode.

More precisely, this invention concerns a two-way communication device including a master transmitter connected to at least one slave transmitter by an active connection wire, the master transmitter and the slave transmitter having a common reference, the master transmitter being able to transmit a master signal to the slave transmitter and the slave transmitter being able to transmit a slave signal to the master transmitter, characterised in that the master signal is a digital modulation in voltage and the slave signal is a digital modulation in current.

According to a first mode of the invention, the master and slave transmitters are connected to a power supply. The master signal comprises a transmission clock and data.

According to a second mode of the invention, only the master transmitter is connected to a power supply, the master transmitter transmitting a polarised master signal to the slave transmitter. The polarised master signal comprises a transmission clock, data and energy.

This invention also concerns a method for two-way communication between a master transmitter and at least one slave transmitter connected by an active connection wire, including the following steps:

a) transmit a master signal, the master signal being a digital modulation in voltage, and b) transmit a slave signal, the slave signal being a digital modulation in current.

According to the first mode of the invention, the master signal comprises a transmission clock and data.

According to the second mode of realisation of the invention, the method also includes a step to polarise the master signal (voltage offset) before the step to transmit the master signal from the master transmitter to the slave transmitter, the resulting master signal being a digital modulation in voltage which comprises a transmission clock, data and energy. According to the second mode of realisation of the invention, the method also includes a step to polarise the slave signal (current offset).

Consequently, the invention makes it possible to transmit on a single communication wire connecting two digital data systems in a simultaneous transmission mode and in both directions (full duplex), a synchronous clock of the data transmitted, a reset signal and possibly energy.

The invention applies more particularly to the field of fast wire communications (<10 Mbits) and to systems with limited energy and physical connection means. The invention can be used in mature, highly standardised environments with rationalised system interconnections. It can also be used to provide paths for the migration of old systems to new systems, retaining stable electrical interfaces, i.e. standardised connectors.

Lastly, another advantage of the invention is that the production costs involved in the manufacture of communication means can be optimised (high manufacturing volumes, reduced manufacturing costs).

BRIEF DESCRIPTION OF THE DRAWINGS

This invention is illustrated by non-limiting examples on the attached Figures, in which identical references refer to similar elements.

DETAILED DESCRIPTION OF THE INVENTION

Figure 1:
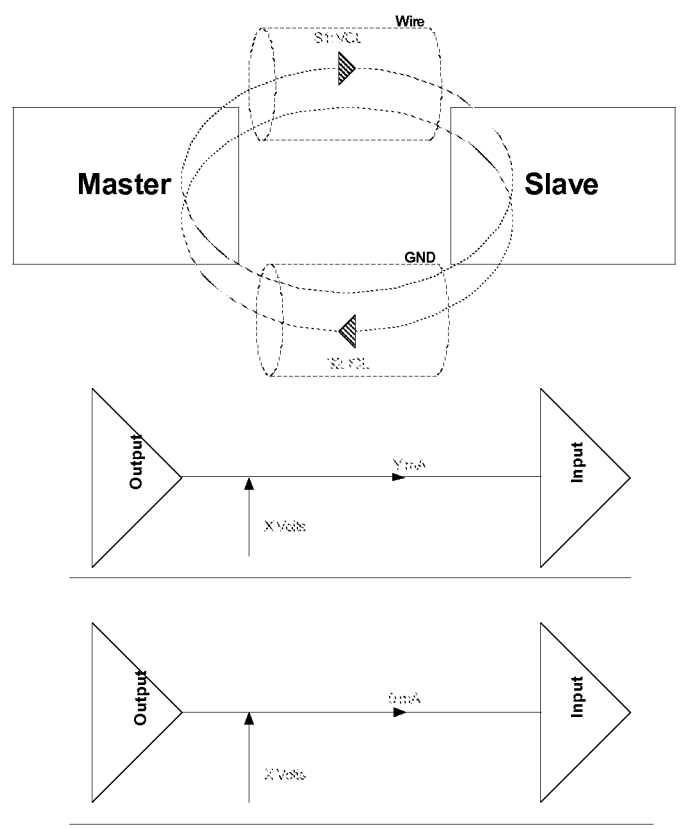
FIG. 1 is a diagrammatic representation of a communication system according to the present invention.

As shown by FIG. 1, the principle of the present invention is to allow a two-way, simultaneous digital communication via a single connector by means of two different physical and electrical quantities, i.e. a voltage and an electric current.

The master signal (S1) transmitted by the master transmitter to the slave transmitter is a digital modulation (logic 0 or 1) in voltage (VCL). The slave signal (S2) transmitted by the slave transmitter to the master transmitter is a digital modulation (logic 0 or 1) in current (ICL).

Figure 2A:
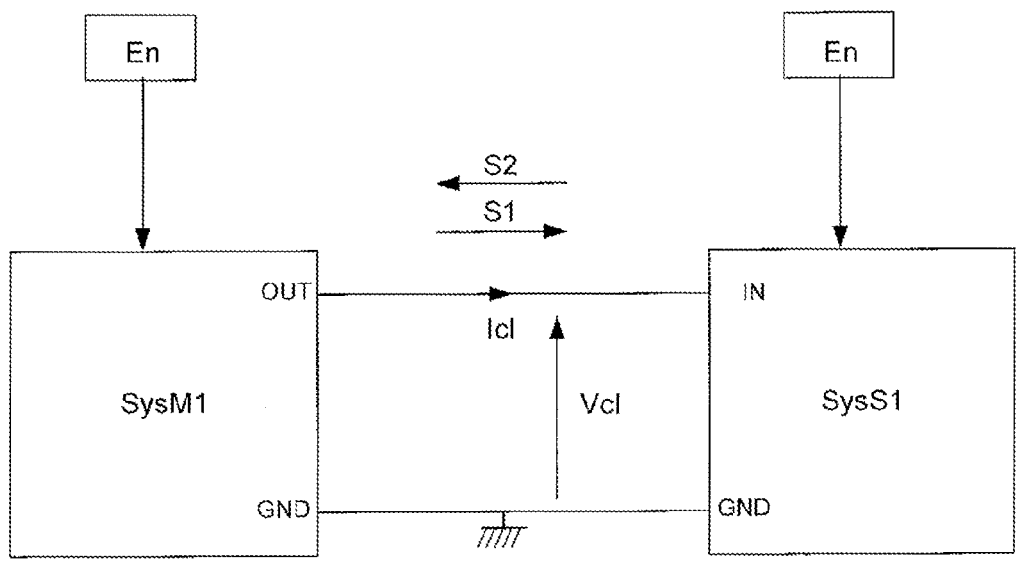
FIGS. 2A and 2B is a diagrammatic representation of a communication system according respectively to a first and a second mode of realisation of the invention respectively with energy transmission and without energy transmission.

FIG. 2A shows a communication device according to a first mode of realisation of the invention comprising a master system SysM1 connected to a slave system SysS1. According to this first mode of realisation, without energy transmission, the master and slave transmitters are connected to power supply means En.

The master system SysM1 and the slave system SysS1 both have a connection GND connected to a common reference. Advantageously, this common reference is an analogue ground.

The master signal S1 transmitted by the master transmitter to the slave transmitter is a digital modulation (logic 0 or 1) in voltage VCL. The master signal S1 has a transmission clock, data and a reset (or initialisation) signal.

The slave signal (S2) transmitted by the slave transmitter to the master transmitter is a digital modulation (logic 0 or 1) in current ICL. The slave signal S2 only includes data.

Figure 2B:
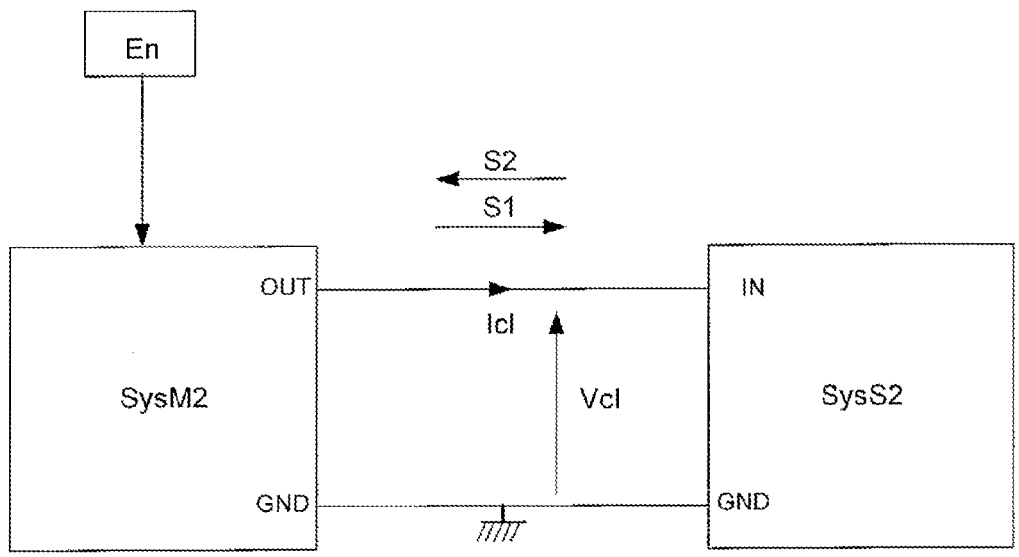

FIG. 2B shows a communication device according to a second mode of realisation of the invention comprising a master system SysM2 connected to a slave system SysS2. According to this second mode of realisation, with energy transmission, only the master transmitter is connected to power supply means En.

The master signal S1 has a transmission clock, data, a reset (or initialisation) signal and energy.

The slave signal S2 only includes data.

We will describe in more detail the first mode of realisation, then the second mode of realisation and lastly various aspects of the invention specific to both modes of realisation.

First Mode of Realisation—without Energy Transfer

Figure 3:
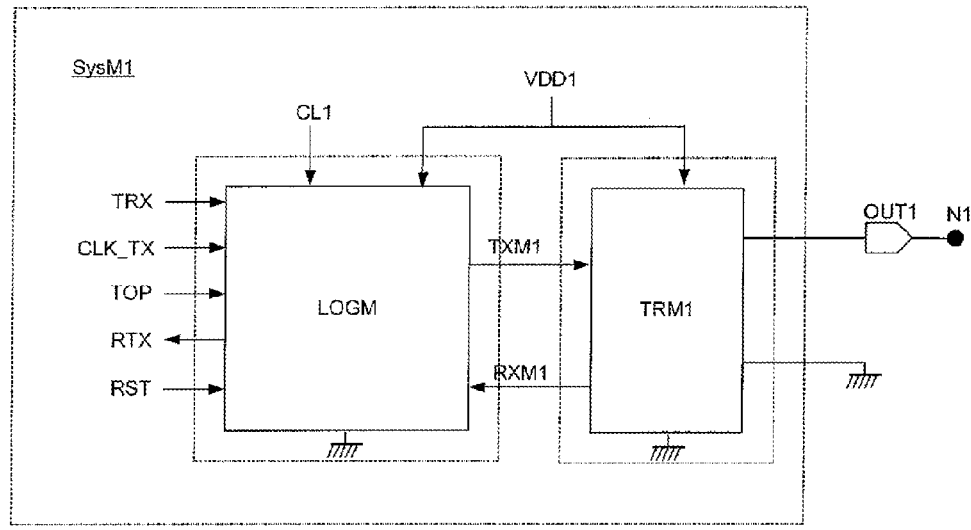
FIG. 3 represents a functional diagram of a master system according to the first mode of realisation of the invention.

FIG. 3 shows the master system SysM1 in more detail. It includes a master logic circuit LOGM connected to a master transmitter TRM1. The master logic circuit, connected to a digital system (not shown), exchanges standard transmission TRX, emission RTX, initialisation RST, synchronisation TOP and transmission clock CLK_TX signals. The logic circuit LOGM receives an internal clock signal CL1 and is powered by a voltage VDD1. The master logic circuit LOGM is connected to the master transmitter TRM1 by a connection for data transmission TXM1 to the master transmitter and by a connection for data reception RXM1 from the slave transmitter.

The master transmitter TRM1 is powered by the voltage VDD1. It transmits and receives signals to/from a slave system SysS1 via an input/output OUT1.

The master logic circuit LOGM and the master transmitter TRM1 are connected to a common reference (for example a ground).

Figure 4:
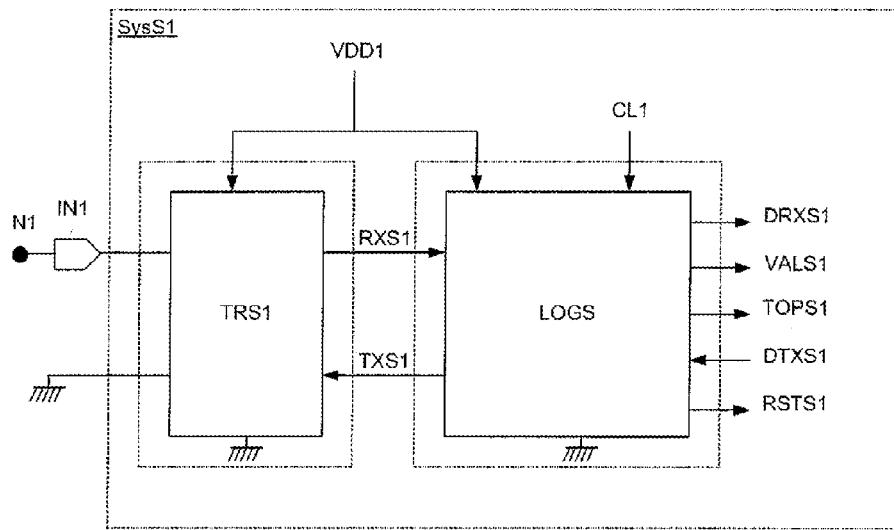
FIG. 4 represents a functional diagram of a slave system according to the first mode of realisation of the invention.

FIG. 4 shows the slave system SysS1 in more detail. The slave system SysS1 and the master system SysM1 are connected by the node N1.

The slave system SysS1 includes a slave logic circuit LOGS connected to a slave transmitter TRS1. The slave logic circuit, connected to a digital system (not shown), exchanges standard transmission DTXS1, emission DRXS1, initialisation RSTS1, synchronisation TOPS1 and VALS1 signals. The slave logic circuit LOGS receives an internal clock signal CL1 and is powered by a voltage VDD1. The slave logic circuit LOGS is connected to the slave transmitter TRS1 by a connection for data transmission TXS1 to the slave transmitter and by a connection for data reception RXS1 from the slave transmitter.

The slave transmitter TRS1 is powered by the voltage VDD1. It transmits and receives signals to/from the master system SysM1 via an input/output IN1.

The slave logic circuit LOGS and the slave transmitter TRS1 are connected to a common reference (for example a ground).

The values shown in the following diagrams allow analogue simulation.

The transistors are standard enhancement MOSFET type models (PMOS or NMOS) with a transition voltage VT of 0.5 volt whose drain width/length ratio W/L is shown on each diagram as an example. Similarly, the resistor values in ohms or in kohms are given as example.

Figure 5:
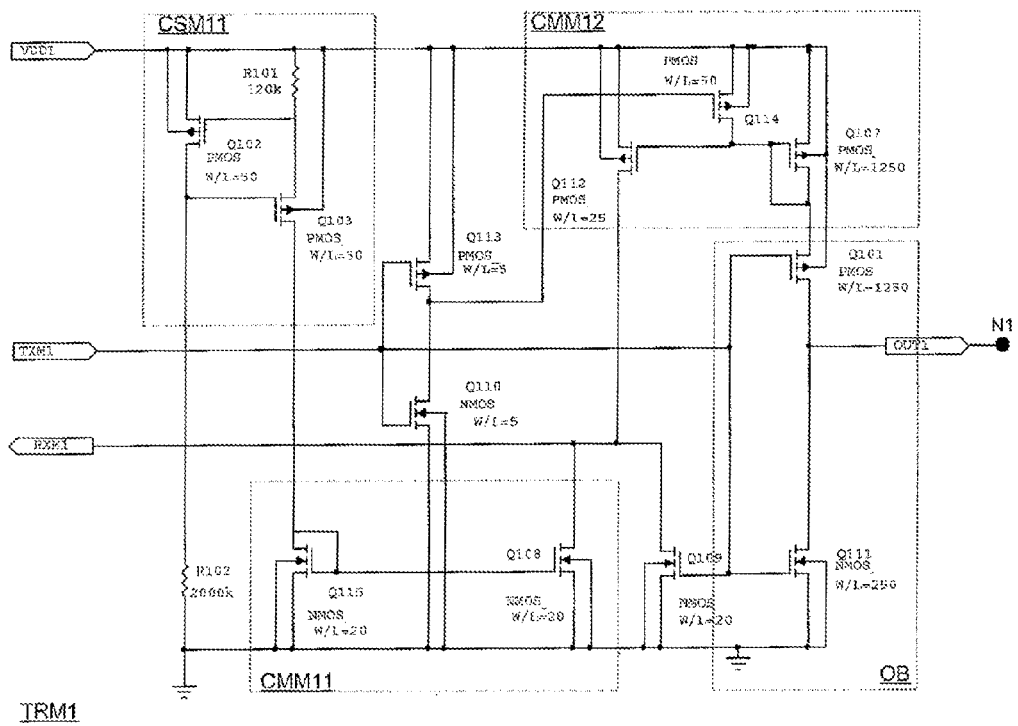
FIG. 5 is a detailed diagram of the master transmitter shown on FIG. 3.

FIG. 5 shows in detail an example of realisation of the master transmitter TRM1 of FIG. 3 for the first mode of realisation, without energy transport.

The master transmitter TRM1 has a current source CSM11 and two current mirrors CMM11 and CMM12. It also has an output buffer OB. It is connected to an input TXM1 and to a power supply source VDD1. It has an output RXM1 and an output OUT1 connected to the node N1.

The master transmitter TRM1 operates as follows. The current flowing in transistor Q112 is equal to 1/50th of the current crossing transistor Q107 (current mirror CMM12) when the input TXM1 is at level 0 (transistor Q101 is ON) and when a current consumer is connected to the output OUT1 (transistor Q111 is OFF). The current crossing transistor Q108 is equal to the current crossing transistor Q103 (current mirror CMM11 via transistor Q115). If the current towards the output OUT1 is less than 50 times the current crossing transistor Q103, then the output RXM1 is 0. When the input TXM1 is VDD1 (i.e. a logic 1) then RXM1 is 0. The current detection threshold ILH (see FIG. 16) is equal to the value of the current source (i.e. approximately the value of the ratio VT/R1 where VT is the transition voltage of transistor Q101 (0.5 volt in the example) multiplied by the ratio of the ratios W/L of transistors Q107 and Q112. If the output impedance of the master transmitter is low (e.g. a few ohms) then the current consumption on the output OUT1 has little impact on the level of the master signal S1. Absence of signal TXM1 during a given time is interpreted as an initialisation signal for the slave transmitter. Note that the maximum output voltage is less than or equal to the value of VDD-VT (where VT is the transition voltage of transistor Q107).

Figure 6:
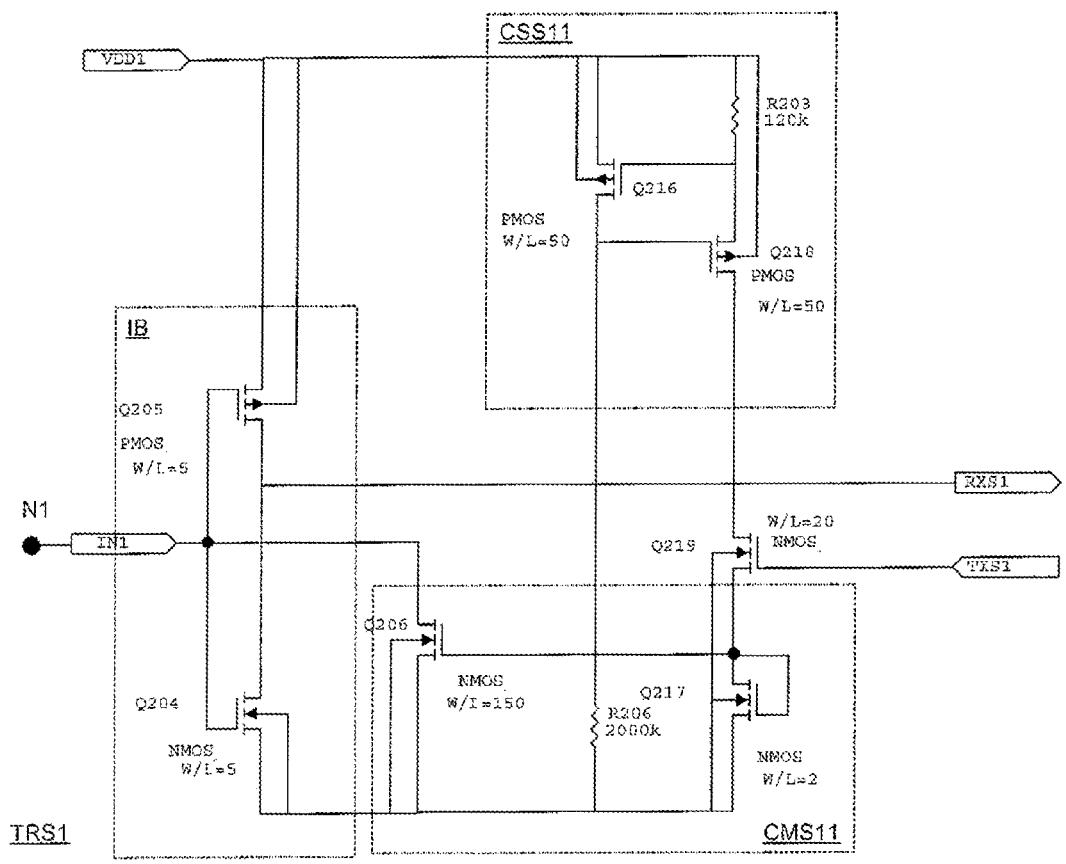
FIG. 6 is a detailed diagram of the slave transmitter shown on FIG. 4.

FIG. 6 shows in detail an example of realisation of the slave transmitter of FIG. 4 for the first mode of realisation, without energy transport.

The slave transmitter TRS1 has a current source CSS11 and a current mirror CMS11. It also has an input buffer IB. It is connected by the input IN1 to the node N1, to the input TXS1 and to the power supply source VDD1. It has an output RXS1.

The slave transmitter TRS1 operates as follows. The current flowing in the input IN1 is equal to 75 times the current flowing in transistor Q218 due to the current mirror CMS11 (transistors Q217/Q206) and if transistor Q219 is ON (the signal on the input TXS1 has the value of VDD1). The signal on the output RXS1 is the complement of the signal IN1 due to the inverter (transistors Q205/Q204) of the input buffer IB.

Second Mode of Realisation—with Energy Transfer

Figure 7:
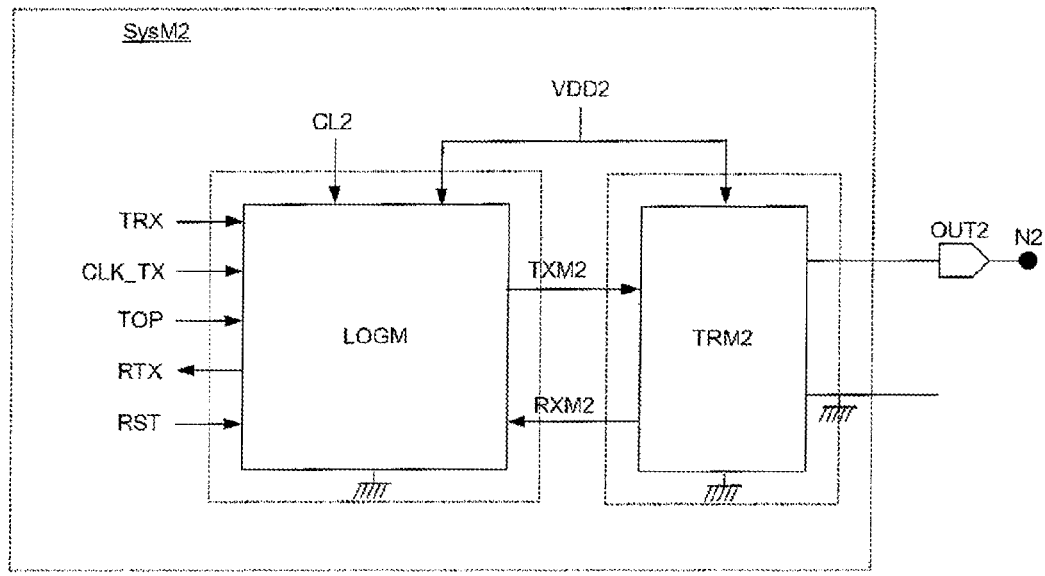
FIG. 7 is a functional diagram of a master system according to the second mode of realisation of the invention.

FIG. 7 shows the master system SysM2 in more detail. It includes a master logic circuit LOGM connected to a master transmitter TRM2. The master logic circuit, connected to a digital system (not shown), exchanges standard transmission TRX, emission RTX, initialisation RST, synchronisation TOP and transmission clock CLK_TX signals. The logic circuit LOGM receives an internal clock signal CL2 and is powered by a voltage VDD2. The master logic circuit LOGM is connected to the master transmitter TRM2 by a connection for data transmission TXM2 to the master transmitter and by a connection for data reception RXM2 from the master transmitter.

The master transmitter TRM2 is powered by the voltage VDD2. It transmits and receives signals to/from a slave system SysS2 via an input/output OUT2.

The master logic circuit LOGM and the master transmitter TRM2 are connected to a common reference (for example a ground).

Figure 8:
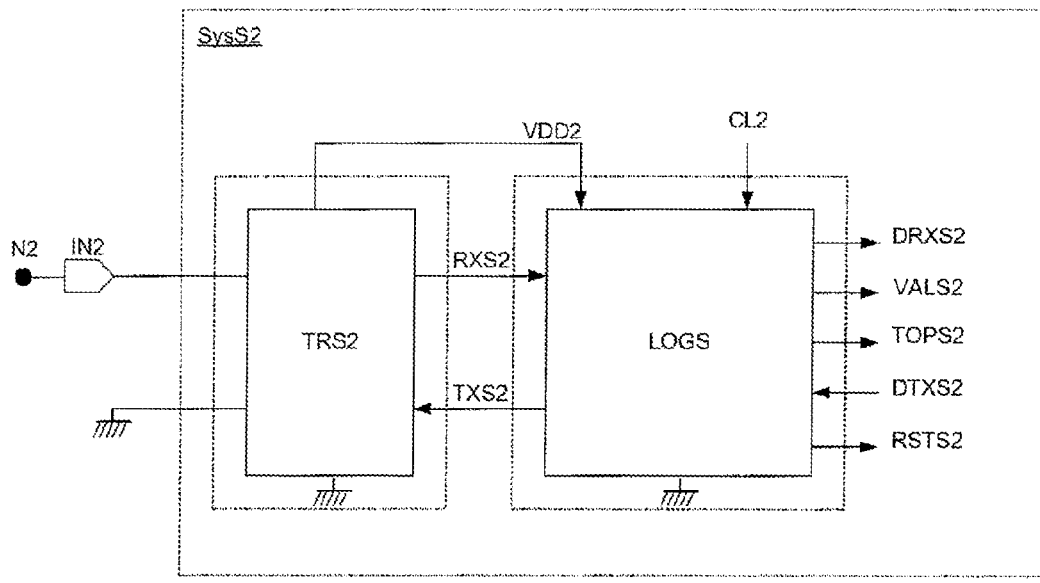
FIG. 8 is a functional diagram of a slave system according to the second mode of realisation of the invention.

FIG. 8 shows the slave system SysS2 in more detail. The slave system SysS2 and the master system SysM2 are connected by the node N2. The slave system SysS2 includes a slave logic circuit LOGS connected to a slave transmitter TRS2. The slave logic circuit, connected to a digital system (not shown), exchanges standard transmission DTXS2, emission DRXS2, initialisation RSTS2, synchronisation TOPS2 and VALS2 signals.

The slave logic circuit LOGS receives an internal clock signal CL2. The slave logic circuit LOGS receives its power supply VDD2 by the slave transmitter TRS2. The slave logic circuit LOGS is connected to the slave transmitter TRS2 by a connection for data transmission TXS2 to the slave transmitter and by a connection for data reception RXS2 from the slave transmitter.

The slave transmitter TRS2 extracts its power supply VDD2 from the master signal S1 received from the master transmitter TRM2. It transmits and receives signals to/from the master system SysM2 via an input/output IN2.

The slave logic circuit LOGS and the slave transmitter TRS2 are connected to a common reference (for example a ground).

Figure 9:
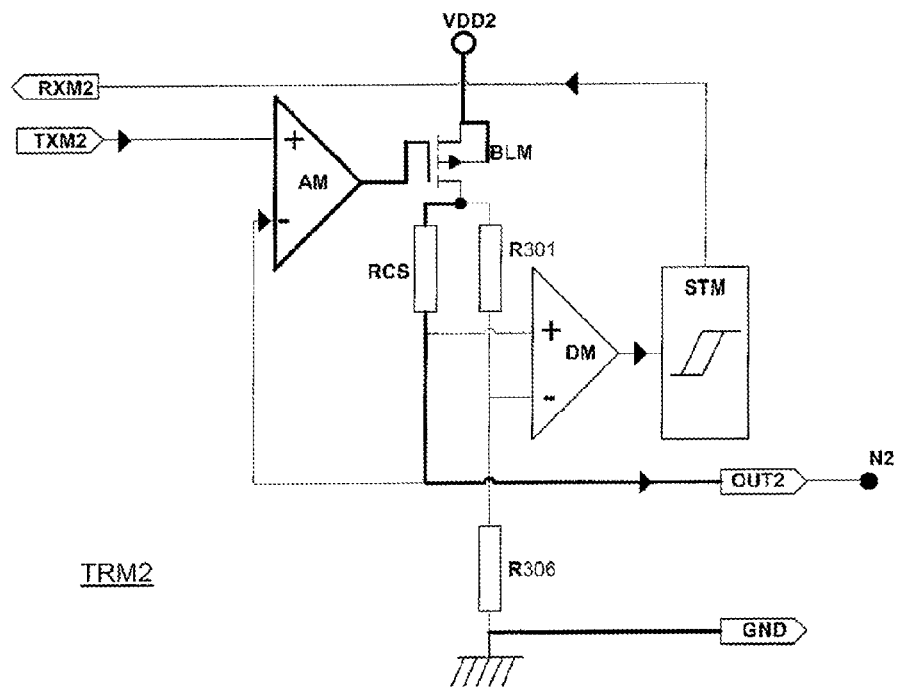
FIG. 9 is a functional diagram of the master transmitter shown on FIG. 7.
Figure 11:
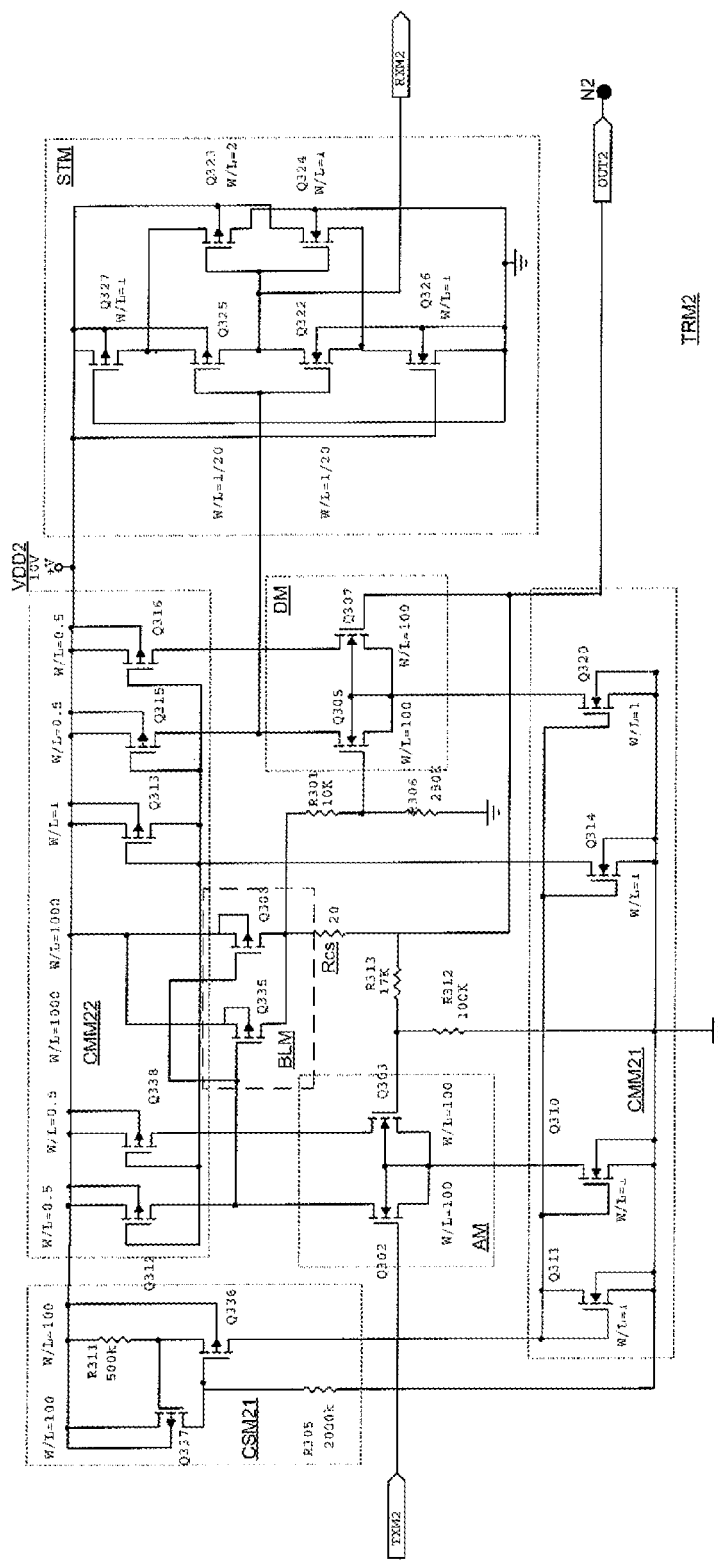
FIG. 11 is a detailed diagram of the master transmitter shown on FIGS. 7 and 9.

FIGS. 9 and 11 show in detail an example of realisation of the master transmitter TRM2 of FIG. 7 for the second mode of realisation, with energy transport.

The master transmitter TRM2 has a current source CSM21 and two current mirrors CMM21 and CMM22. It also has an amplifier AM and a ballast BLM in input, a detector DM as well as a current measurement resistor $R_{cs}$ and a Schmitt trigger in output STM. It is connected to an input TXM2 and receives the power supply voltage VDD2. It has an output RXM2 and an output OUT2 connected to the node N2.

The master transmitter TRM2 operates as follows. The master transmitter TRM2 is more complex since the master signal S1 is polarised. The amplifier AM is a voltage follower circuit composed of transistors Q302/Q303 for the differential part and Q335/Q306 for the output stage of the Ballast BLM. In series with the output of the amplifier AM, the resistor $R_{cs}$ is used to measure the current consumed by the slave transmitter. The detector DM is a voltage comparator (transistors Q305/Q307) which trips when the output current is:

$$I_{OUT2} = V_{OUT2} \frac{R1}{Rcs \times R6}$$

The Schmitt trigger STM formed by transistors Q327, Q325, Q322, Q326, Q323, Q324 is used to digitise the signals output from the detector DM. It is recommended to complete this simple filtering by suitable digital filtering (not shown) well-known by those skilled in the art.

Figure 10:
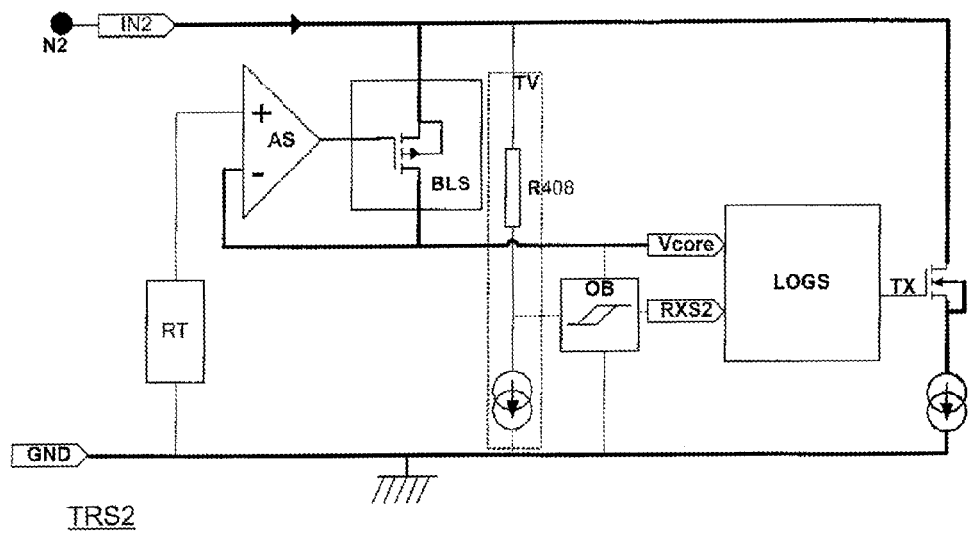
FIG. 10 is a functional diagram of the slave transmitter shown on FIG. 8.
Figure 12:
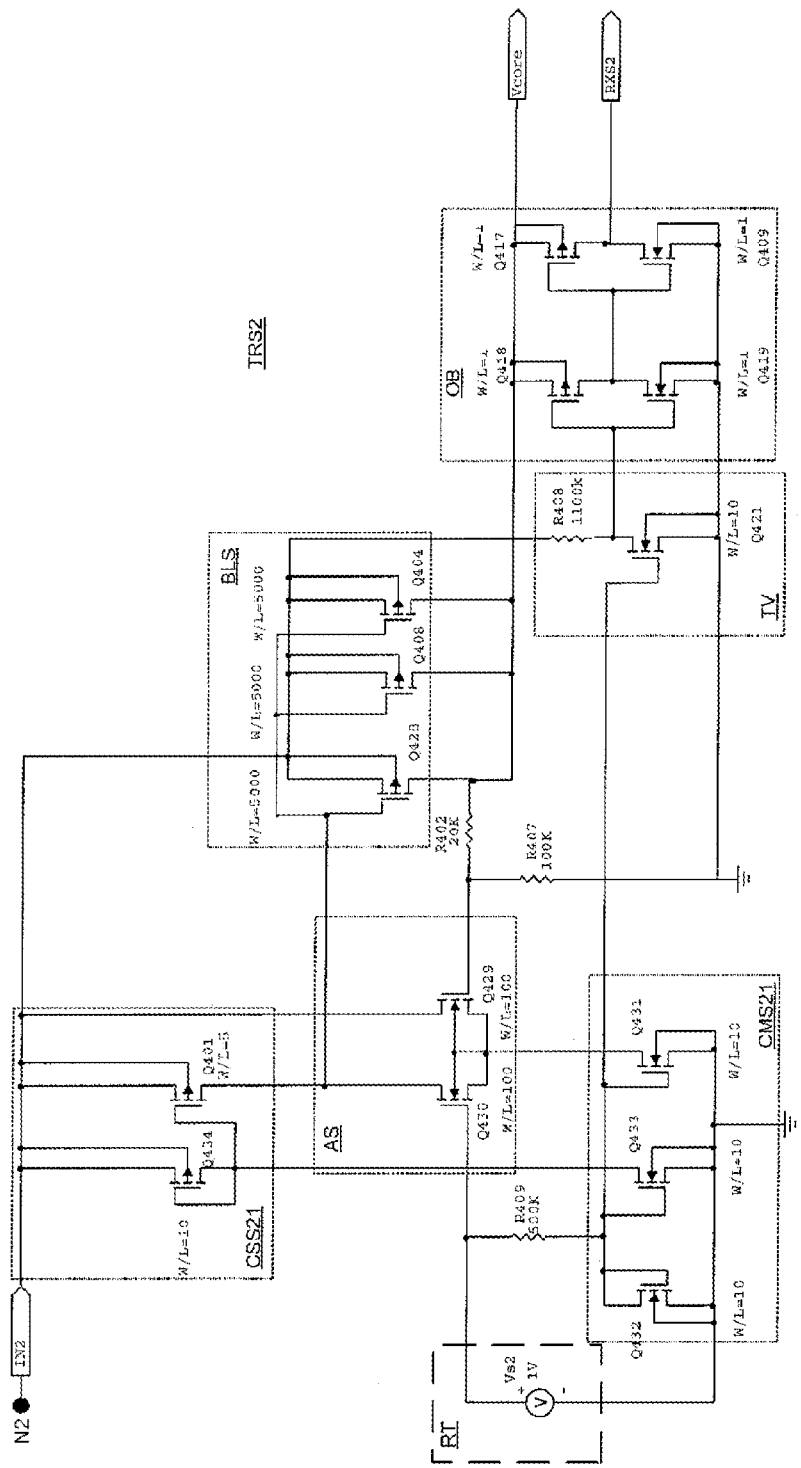
FIG. 12 is a detailed diagram of the slave transmitter shown on FIGS. 8 and 10.

FIGS. 10 and 12 show in detail an example of realisation of the slave transmitter of FIG. 8 for the second mode of realisation, with energy transport.

The slave transmitter TRS2 has a current source CSS21 and a current mirror CMS21. It also has a voltage series regulator composed of an operational amplifier AS and its ballast transistor BLS, a voltage translator TV and a schmitt trigger OB connected to the output RXS2. The schmitt trigger is used to reformat the data extracted from the master signal S1. It is connected by the input IN2 to the node N2.

The voltage regulator is composed of a voltage reference RT, a differential amplifier AS (transistors Q429/Q430) and a ballast BLS (transistors Q428/Q408/Q404). The voltage translator TV is composed of the current source Q421 and the resistor R408. The data from the master signal S1 is reformatted by transistors Q418/Q419 and Q417/Q409 (output buffer OB). In normal operation, the slave transmitter assembly must consume a current less than ILL (see FIG. 16) so that the master transmitter does not interpret this consumption as a data transmission.

The voltage $V_{CORE}$ is the regulated voltage extracted from the master signal S1 which is used to power the logic of the slave transmitter LOGS.

Encoding of the Master and Slave Signals

Figure 13:
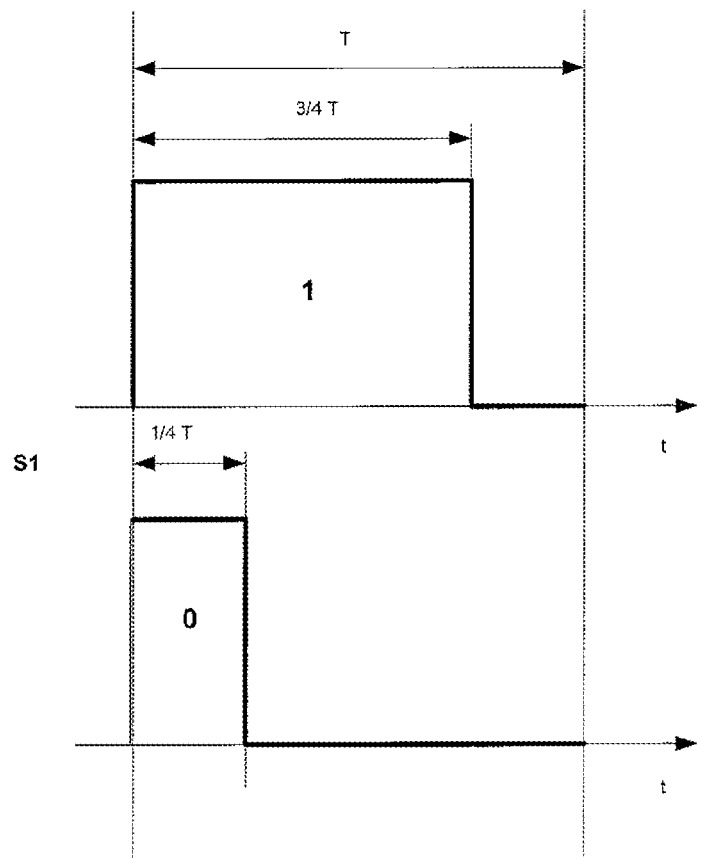
FIG. 13 illustrates the encoding of the master signal for a communication system according to the first mode of realisation of the invention.

FIG. 13 illustrates the encoding of the master signal S1 for a communication system according to the first mode of realisation of the invention. The period T of the master signal S1 is constant. The duration at 1 of a logic 1 is equal to three times the duration at 1 of a logic 0. This encoding is known as "Pulse Width Modulation" PWM or "Return to Zero" RZ. With this encoding, the master signal S1 always includes a high voltage level transmitted to the slave transmitter. The slave transmitter can therefore consume a current of Y mA and transmit the slave signal S2. Consequently, with the communication device described above, the master and slave transmitters form two nested loops: a voltage loop which carries the master signal S1 and a current loop which carries the slave signal S2. Also, the slave signal S2 must be sampled in synchronism with the master signal S1.

This encoding has the advantage of being extremely simple to implement. Other types of encoding may nevertheless be implemented (for example inversion in the encoding of the logic 0 and 1). Preferably, the cyclic ratios between a logic 0 and 1 must be sufficiently different to distinguish between them and to provide immunity against phase jitter.

Figure 14:
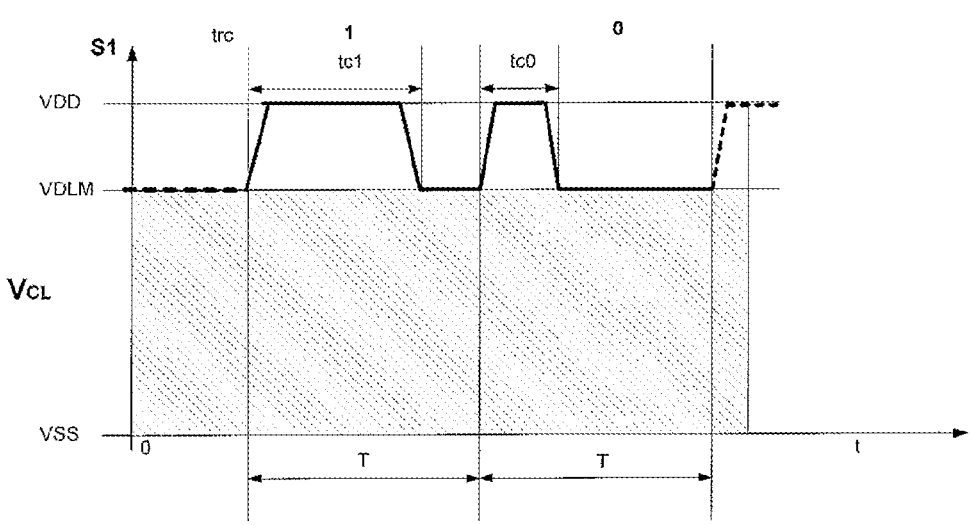
FIG. 14 illustrates the encoding of the polarised master signal for a communication system according to the second mode of realisation of the invention.

FIG. 14 illustrates the encoding of the master signal S1 for a communication system according to the second mode of realisation of the invention. According to this encoding, a continuous component is added to the master signal S1. The polarised master signal S1 distributes energy to the slave mainly when its voltage is greater than VDLM and data when its voltage varies between the levels VDLM and VDD. The encoding of the logic 0 and 1 remains as previously described in relation to FIG. 13. The times respect the following equations: tc1=3×tc0 and tc1+tc0=T.

The slave transmitter described in relation to FIGS. 8, 10 and 12, is permanently powered with voltage by the master transmitter. There is no need to store electrical energy in a capacitor.

This system offers the advantage that it can be manufactured as an integrated circuit without a capacitor which takes up a lot of space and increases the costs.

A slave transmitter equipped with a simple series voltage limiter or regulator is sufficient to extract the energy from the master signal S1.

Figure 15:
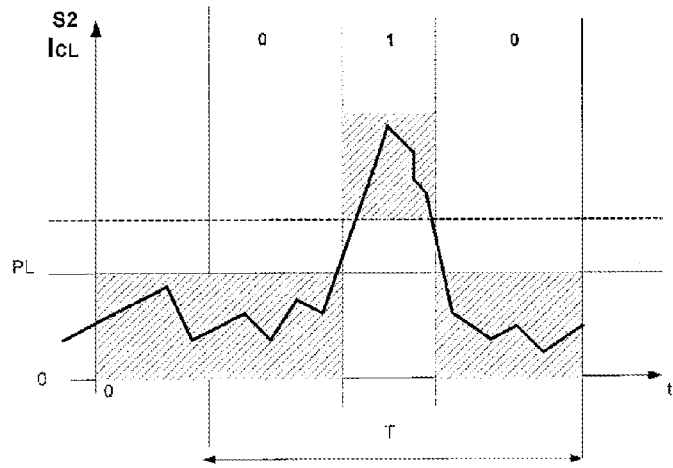
FIG. 15 shows the shape of the slave signal.

The same principle is applied to the slave signal S2 to which a polarisation current is added. This polarisation current corresponds to the maximum normal consumption of energy by the slave transmitter in normal operation. FIG. 15 shows the shape of the resulting slave signal comprising the polarisation and the data. The operating power is equal to the product of the polarisation current of the slave signal S2 by the polarisation voltage of the master signal S1. The consumption of a current greater than the polarisation current PL is the data contained in the slave signal S2.

Figure 16:
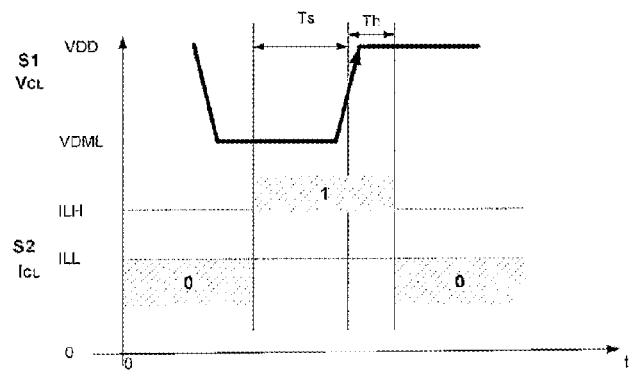
FIGS. 16 and 16A illustrates the principle used by the master signal to synchronise the slave signal and the timing of the master signal and the slave signal.

FIG. 16 illustrates the principle used by the master signal to synchronise the slave signal.

The values of the polarised master S1 and slave S2 signals are as follows:

|  |  | S1 (VCL) | |
|---|---|---|---|
|  |  | 0 | 1 |
| S2 (ICL) | 0 | <ILL VDML | <ILL VDD |
|  | 1 | >ILH VDML | >ILH VDD |

Synchronisation can either be carried out on the rising or the falling front of the master signal S1. However, if energy savings are an important factor of the environment, synchronisation is preferably carried out on the rising front of the master signal S1.

Figure 16A:
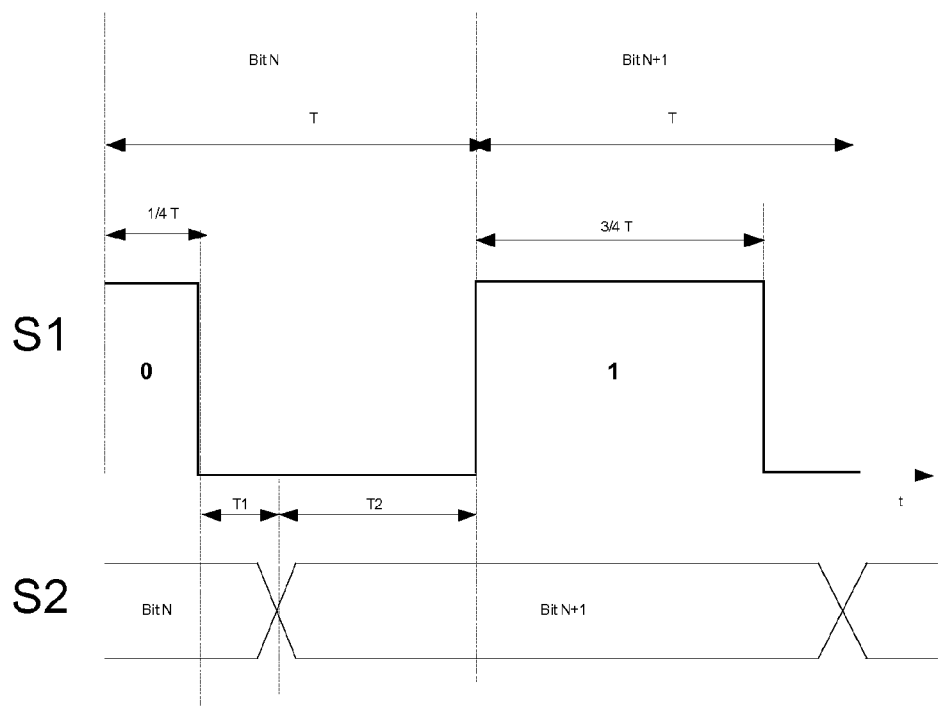

FIG. 16A illustrates the timing of the S2 signal related to the S1 signal. As seen on FIGS. 16 and 16A, in said illustrated embodiment, the switching (S2 signal) is performed when the signal S1 is low. The T1 and T2 times must be greater 10 ns. Of course, the real S2 waveform is the result of the logical AND of the S2 signal switching and the S1 signal.

Figure 17:
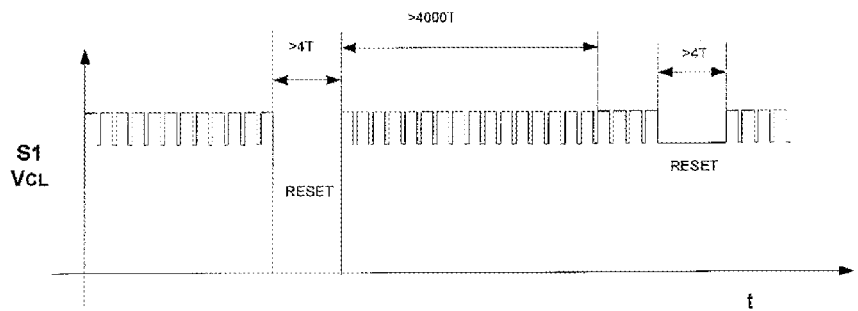
FIG. 17 illustrates the principle used by the master transmitter to initialise the slave transmitter.

FIG. 17 illustrates the principle used by the master transmitter to initialise the slave transmitter.

Initialisation of the logic circuit LOGS of the slave system SysS1 or SysS2 is carried out when the master signal S1 is a predetermined fraction of the level VDML. Another method consists in interrupting the transmission clock for a given time, for example 4 times the period T.

Figure 18:
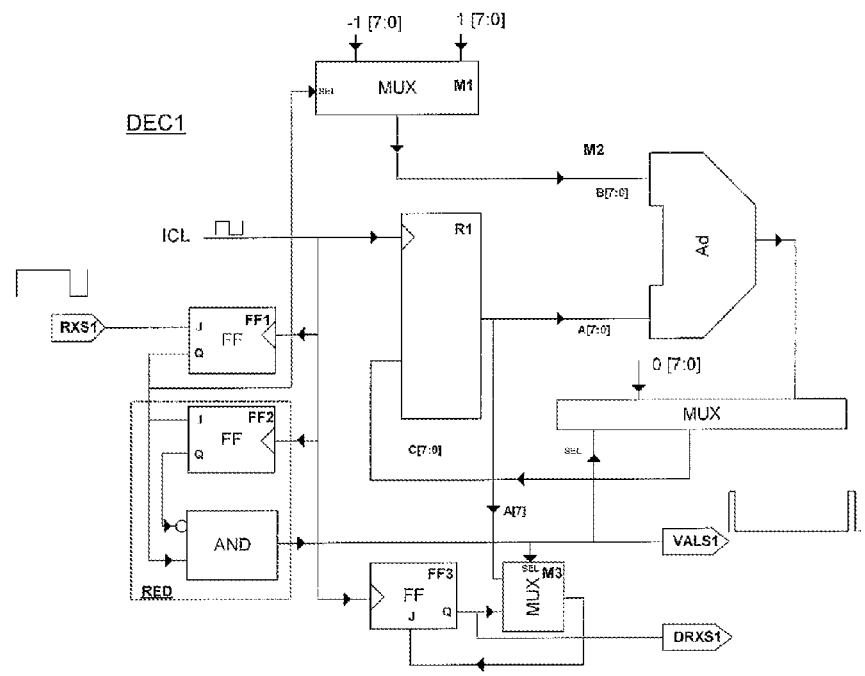
FIG. 18 is a detailed diagram of a first variant of the master signal decoder.

FIG. 18 is a detailed diagram of a first variant of the master signal decoder DEC1. This decoder enables the slave system SysS1 to decode the master signal S1 for the first mode of realisation of the invention. The decoder operates as follows. The encoded signal applied on the input RXS1 enters a flip-flop FF1 to be synchronised by an internal clock ICL. The clock ICL must be less than T/8 and greater than T/128 where T is the period of the master signal S1. When the signal on the input RXSL is at level 1 then the output B of the multiplexer MUX M1 is 1. The counter formed by the register R1 and the adder Ad count. The output A of the register R1 increments on each front of the clock ICL. When the signal on the input RXS1 is at level 0 then the output B of the multiplexer MUX M1 is 1. The output A of the register R1 decrements on each front of the clock ICL. On the rising front of the signal on the input RSX1, the output from the front detector RED formed by the flip-flop FF2 and the AND gate is 1. The output B from the multiplexer MUX M1 is 0. The input of the flip-flop FF3 is A[7] corresponding to the sign of A. The output A of the register R1 is 0 after the front of the clock ICL. Consequently, the signal on the output VALS1 of the decoder is synchronised with the internal clock ICL and the transmission clock integrated with the signal on the input RXS1.

A signal appears on the output VALS1 each time a bit has been decoded (0 or 1). This signal times an offset register which deserialises the bits and stores them in packets of 8 or more bits.

Figures 19, 20:
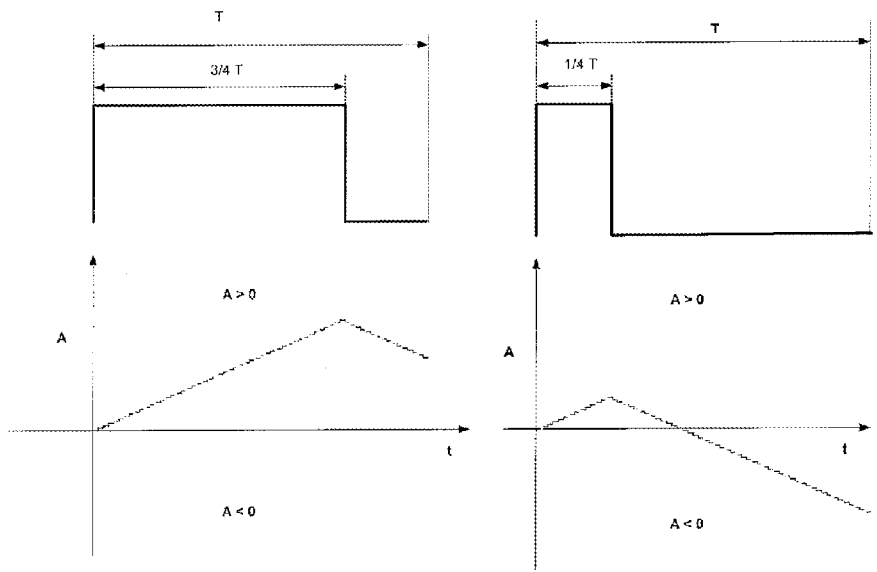
FIGS. 19 and 20 illustrate the operating principle of the first variant of the master signal decoder.

The variation of the counter for a master signal S1 encoding a logic 1 is illustrated on FIG. 19. The variation of the counter for a master signal S1 encoding a logic 0 is illustrated on FIG. 20.

The flip-flop FF3 is used to sample the sign bit, which is on the output Q of the flip-flop FF3 connected to the output DRXS1.

The transmission clock integrated in the master signal S1 is not used for decoding but is available on the output VALS1. The output VALS1 can interface with a UART (Universal Asynchronous Receiver Transmitter) or USART (Universal Synchronous Asynchronous Receiver Transmitter) transmission controller. In addition, this type of decoder is advantageous since it continues to operate even if the transmission clock varies from one bit to another.

Figure 21:
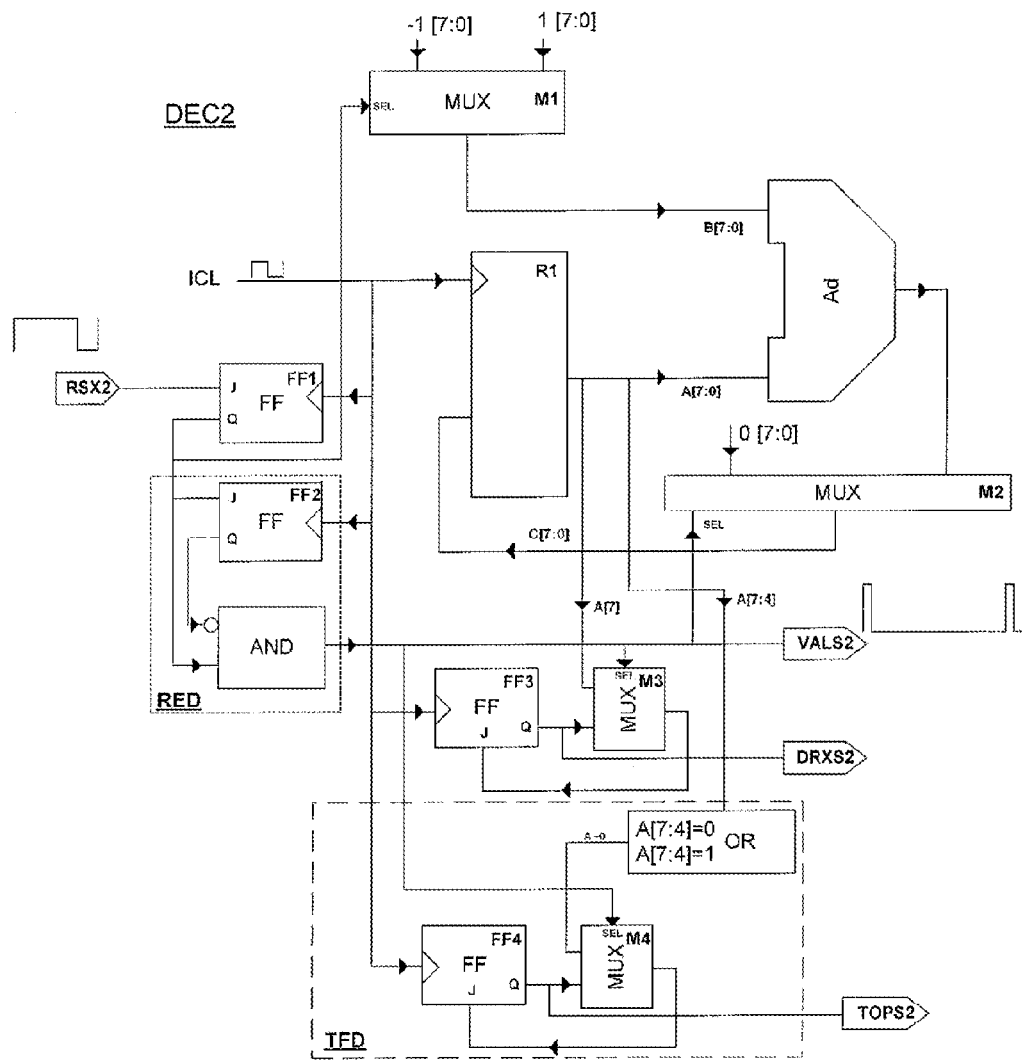
FIG. 21 is a detailed diagram of a second variant of the master signal decoder.

FIG. 21 is a detailed diagram of a second variant of the master signal decoder DEC2. This decoder enables the slave system SysS2 to decode the master signal S1 for the second mode of realisation of the invention.

The decoder operates in the same way as that described in relation to FIG. 18. In addition, the decoder has an end of frame pulse detector TFD including a flip-flop FF4 and a multiplexer MUX M4.

A signal appears on the output VALS2 each time a bit has been decoded (0 or 1). This signal times an offset register which deserialises the bits and stores them in packets of 8 or more bits.

A signal appears on the output TOPS2 and is transmitted to the slave transmitters to indicate that the master transmitter has received a frame. This signal, whose cyclic ratio is 1/2, does not carry a logic value 0 or 1.

Figure 22:
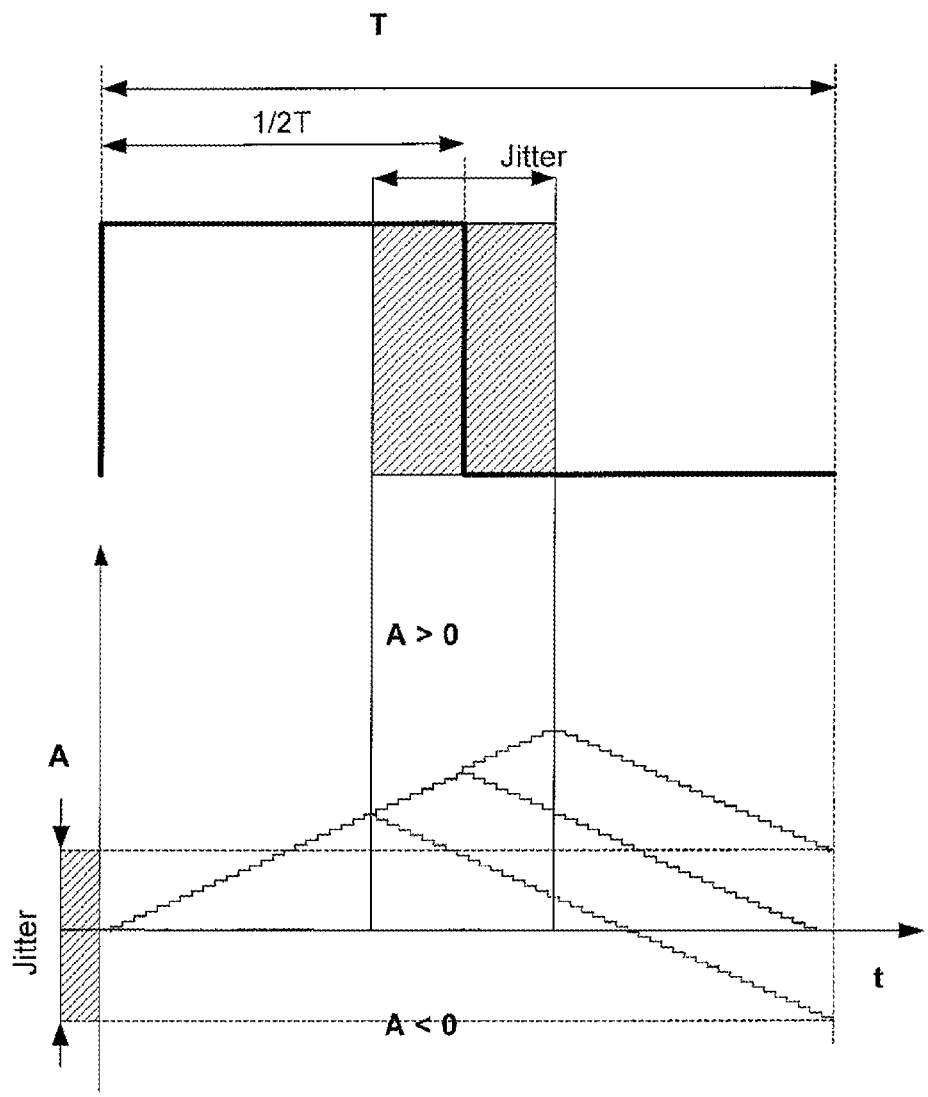
FIG. 22 represents a master signal corresponding to a frame reception end bit.

FIG. 22 shows the chronogram of the frame reception end bit transmitted by a master transmitter at the end of the transmission from a slave. The modulation PWM described above also includes a code whose cyclic ratio is 1/2. This value can easily be detected by the second variant of the decoder, using the measurement of the absolute value of the signal from output A which must be close to zero (depending on the jitter). The end of frame pulse can be transmitted at any time by the master transmitter as soon as it has received a complete reception frame from a slave transmitter. The end of frame pulse can therefore be transmitted in the middle of a message intended for a slave transmitter. The end of frame pulse has no logic value 1 or 0. Consequently, it is not transmitted to the UART/USART type transmission controller.

Figure 23:
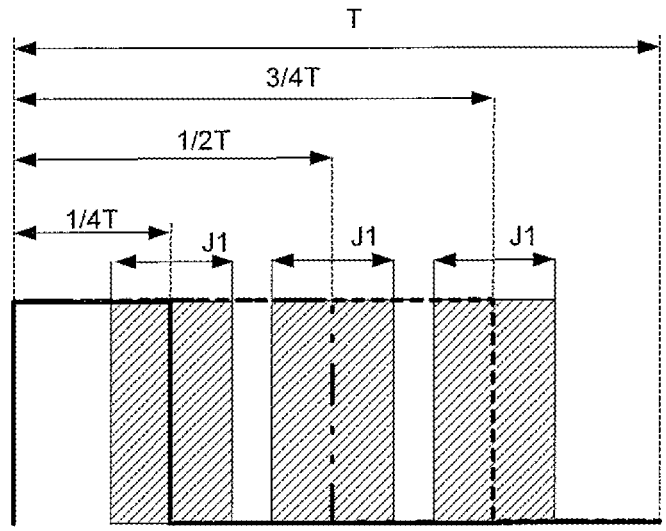
FIG. 23 illustrates the effects of phase jitter on the master signal.

FIG. 23 illustrates the effects of phase jitter J1 on the master signal S1. The electrical noise affects the stability of the transmitter's internal clocks and the synchronisation of the internal clocks of the master and slave transmitters. The choice of cyclic ratio for the logic 0 (1/4T), the logic 1 (3/4T) and the frame reception end bit (1/2T) depends on the amount of jitter. It is important not to choose cyclic ratios which would make it impossible to distinguish between the various logic states when jitter occurs.

Figure 24:
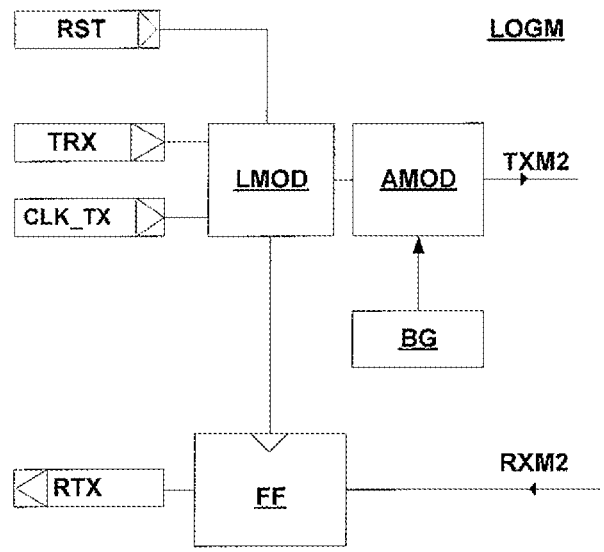
FIG. 24 is a functional diagram of a logic circuit associated with the master transmitter.

FIG. 24 is a diagrammatic representation of a logic circuit for the master transmitter. The master logic circuit LOGM, connected to a digital system (not shown), exchanges standard transmission TRX, emission RTX, initialisation RST and transmission clock CLK_TX signals (see FIG. 7). The master logic circuit LOGM is connected to the master transmitter (for example TRM2) by connections TXM2 and RXM2. The master logic circuit LOGM has a logic modulator LMOD, an analogue modulator AMOD, a voltage reference BG and a flip-flop FF.

The logic modulator LMOD receives the transmission TRX and transmission clock CLK-TX signals and is connected to the analogue modulator AMOD and to the flip-flop FF.

The analogue modulator AMOD is connected to the voltage reference BG and receives the initialisation signal RST. It supplies the signal TXM2 to a master transmitter (e.g. TRM2).

The flip-flop receiving the signal RX from the master transmitter transmits the emission signal RTX under the control of the logic modulator LMOD. An analogue master logic circuit LOGM (not shown) can be connected to the master transmitter TRM1.

Examples of Communication Networks

Figure 25:
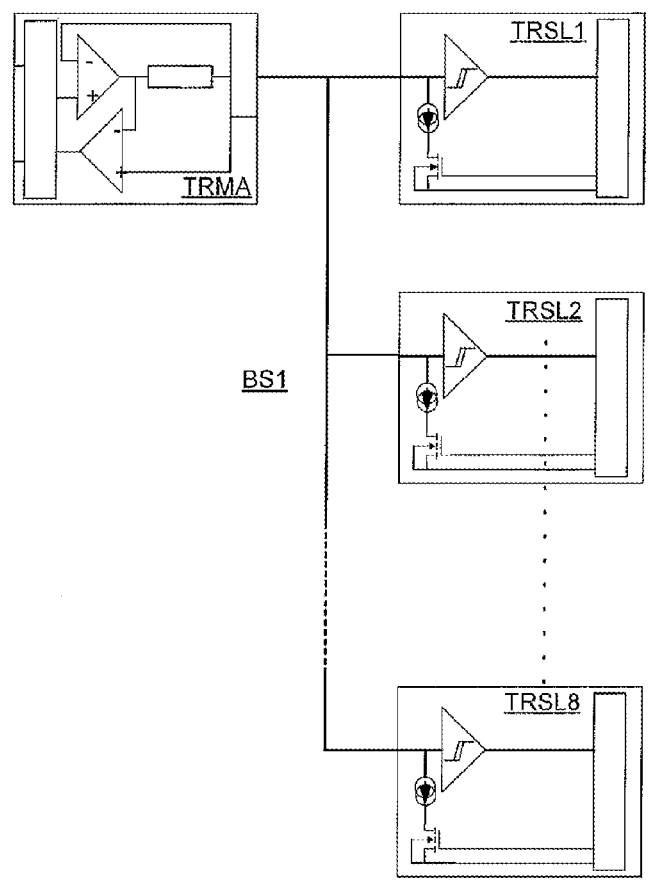
FIG. 25 is a diagrammatic representation of a first network variant including master and slave transmitters according to the first mode of realisation of the invention.

FIG. 25 is a diagrammatic representation of a first network variant including master and slave transmitters according to the first mode of realisation of the invention.

The transmitters without energy transport are adapted to a BUS BS1 type network operating mode. BUS topology is supported. A single master transmitter is used in order to avoid having to implement mechanisms against bus contentions.

The master signal S1 transmitted by the master transmitter TRMA is received by all slave transmitters TRSL1, TRSL2, . . . , TRSL8 (forming a voltage loop). The current detected by the master transmitter TRMA is the sum of the currents consumed by each slave transmitter TRSL1, TRSL2, . . . , TRSL8.

According to the first mode of realisation of the invention, by convention, no current is consumed for a logic zero of the slave signal S2. In this case, the master transmitter TRMA receives a logic OR of the slave signals S2 from the slave transmitters TRSL1, TRSL2, . . . , TRSL8.

The bus addressing can be carried out in two ways.

According to a first type of addressing, the master transmitter TRMA, using a suitable communication protocol, transmits the address of the slave transmitter authorised to transmit a slave signal S2. The slave transmitter, for example TRSL3, transmits its message then the master transmitter TRMA addresses another slave transmitter, for example TRSL7. This type of addressing is known as "polling mode".

According to a second type of addressing, the master transmitter TRMA repeats the bit it reads on the bus. If a slave transmitter, for example TRSL3, transmits a 0 (no current) and the bit read by the master is a 1, then another slave transmitter, for example TRSL7, has use of the bus. The slave transmitter, for example TRSL3, then waits for the next negotiation to try to take the bus. This type of addressing is known as "collision detection mode".

In collision detection mode, the first slave transmitter to send a logic in a negotiation phase takes the bus. There are three possible cases.

In the first case, each slave transmitter has a fixed address. The address encoding determines the priority of one slave transmitter with respect to the others. In this mode, a slave transmitter of low priority will be unable to communicate if a slave transmitter of higher priority monopolises the bus.

In the second case, each slave transmitter has a fixed address and the master transmitter repeats the address of the slave transmitter. This approach is frequently used on Ethernet type networks, especially in the contention resolution protocol (CSMA-CR). Each slave transmitter compares the bit it is transmitting with the bit received and stops transmitting if there is a difference.

In the third case, the BITMAP protocol is used. This is an example of a collision-free protocol. This protocol is mainly used if the number of slave transmitters is fixed and known.

Figure 26:
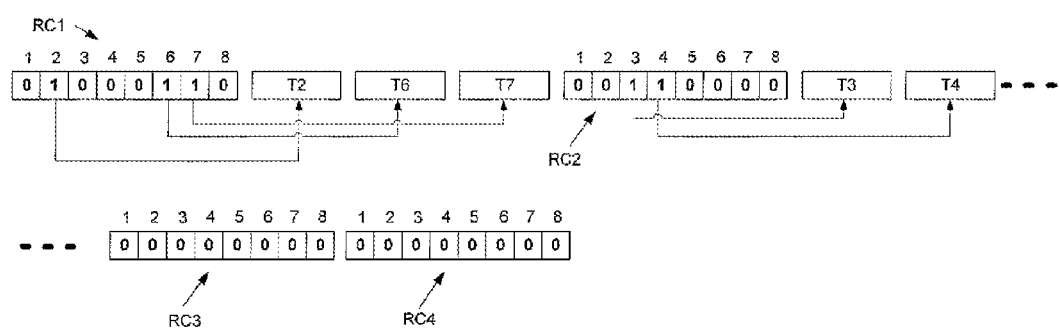
FIG. 26 shows a communication protocol without contention for the network of FIG. 25.

FIG. 26 illustrates a BITMAP type communication protocol for the network of FIG. 25 with 8 slave transmitters. In the contention resolution frame RC1, RC2, RC3, RC4, each slave transmitter has a bit corresponding to its rank (from 1 to 8). This bit allows each slave transmitter to indicate its desire to communicate with the master transmitter. For example, in the contention resolution frame RC1, slave transmitters 2, 6 and 7 indicate their desire to transmit frames T2, T6 and T7 respectively to the master transmitter. The contention bitmap is broadcast on the bus so that each slave transmitter is notified by the requests from the other slave transmitters. Since the slave transmitters cannot know when the other slave transmitters have stopped transmitting, the master transmitter broadcasts an end of frame reception signal on the bus (see for example FIG. 22).

In the network of FIG. 25, the master transmitter can communicate with all the slave transmitters, but the slave transmitters cannot communicate together. Only the master transmitter can in fact interpret the current signal S2 transmitted by the slave transmitters. The master transmitter can switch into a general broadcast mode in which it systematically repeats the bits transmitted by a slave transmitter. The message transmitted by one of the slave transmitters is therefore broadcast over the entire bus.

Figure 27:
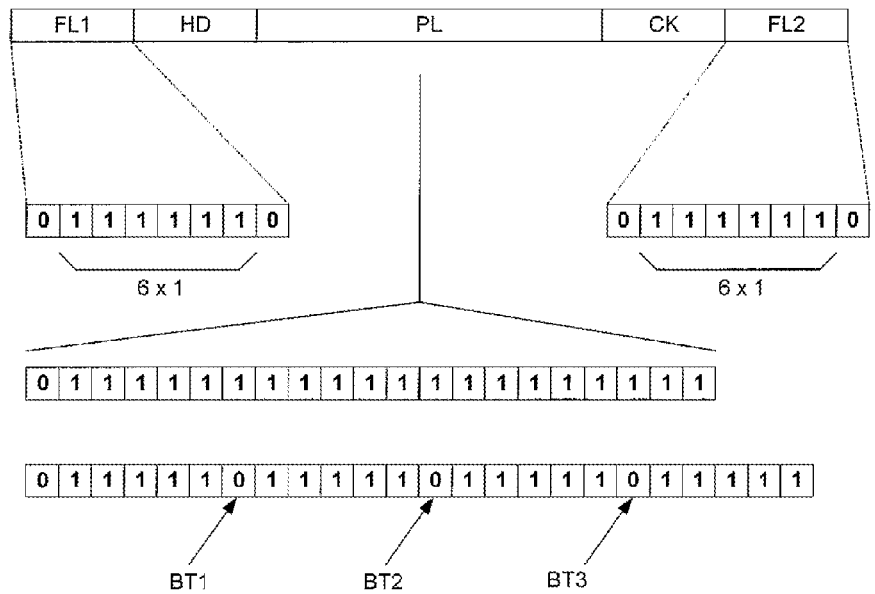
FIGS. 27 and 28 show examples of bit frames in detail.

FIG. 27 illustrates a generic bit frame and its encoding used for communication between the master transmitter and the slave transmitters when the bus is "bit frame oriented".

A frame starts with a start flag FL1 and ends with an end flag FL2. The flags can be identified by a suitable logic circuit (not shown). Between the flags, the frame includes a header HD, data PL and a check code CK. Traditionally, the known "bit stuffing" technique is used. By convention, only flags FL1 and FL2 can have 6 consecutive bits set to logic 1. In the other cases, a specific electronic circuit must:
- on transmission, insert a logic zero in order to obtain sequences of 5 consecutive bits at logic 1;
- on reception, extract the transparency zeros to recreate the original frames.

Figure 28:
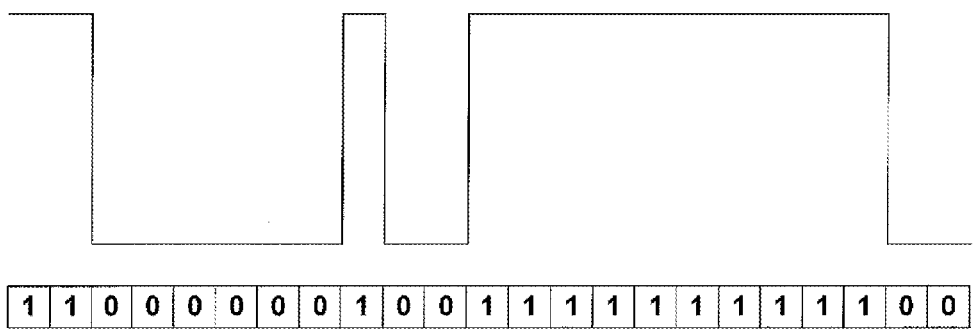

When the communication between the master transmitter and the slave transmitters is carried out by "signal oriented" bus, the decoded RX and TX signals carry binary information which can be used to transmit discretised chronograms as shown on FIG. 28. For example, the RX and TX signals of a UART configured to operate at 100 kBits/s can be transmitted with a bus configured at 2 Mbits/s. It is also possible to modulate an infrared remote control signal RC5 with this type of communication. A combination can be made if the encoding of FIG. 28 is inserted in a bit oriented frame described in relation to FIG. 27 (bit frame oriented bus).

When the communication between the master transmitter and the slave transmitters is carried out by "character oriented" bus, the decoded RX and TX signals can be routed directly to a UART. A zero bit is then considered as a start bit. A speed factor can be obtained if several bits at 1 or 0 are required to transmit/receive a bit to/from the UART.

Figure 29:
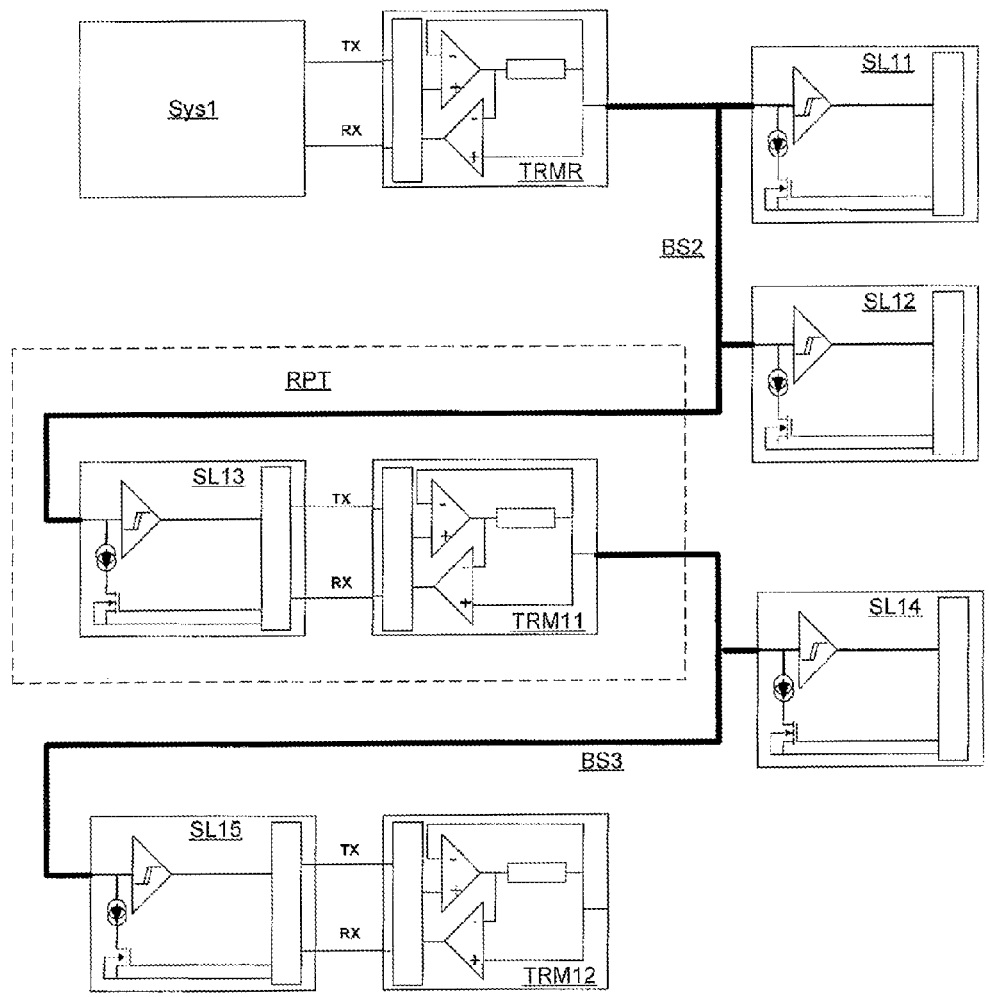
FIG. 29 is a diagrammatic representation of a second network variant including master and slave transmitters according to the first mode of realisation of the invention and a bus repeater.

FIG. 29 is a diagrammatic representation of a second network variant including master and slave transmitters according to the first mode of realisation of the invention and a bus repeater.

A root master transmitter TRMR, connected to an electronic system Sys1, controls secondary master transmitters TRM11 and TRM12. The initial master signal S1 is transmitted by the root master transmitter TRMR and propagated on a first bus BS2 connecting it to the slave transmitters SL11, SL12 and SL13. The slave transmitter SL13 and the secondary master transmitter TRM11 to which it is connected form a bus repeater RPT. The bus repeater RPT is connected to a secondary bus BS3 including slave transmitters SL14 and SL15. The slave transmitter SL15 is connected to the secondary master transmitter TRM12.

Figure 30:
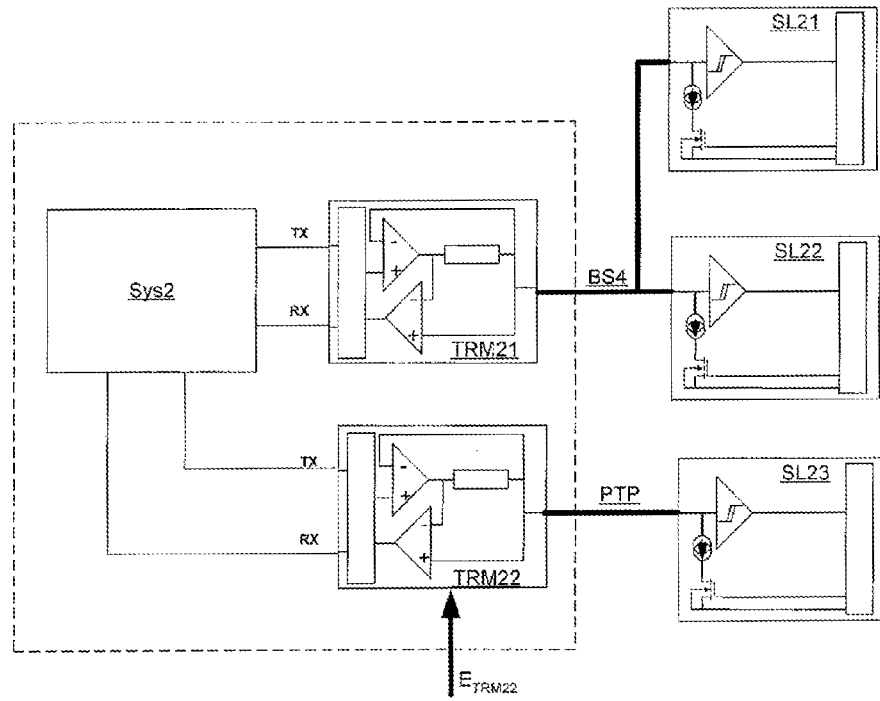
FIG. 30 is a diagrammatic representation of a mixed communication system including master and slave transmitters according to the first and second modes of realisation of the invention.
Figure 31:
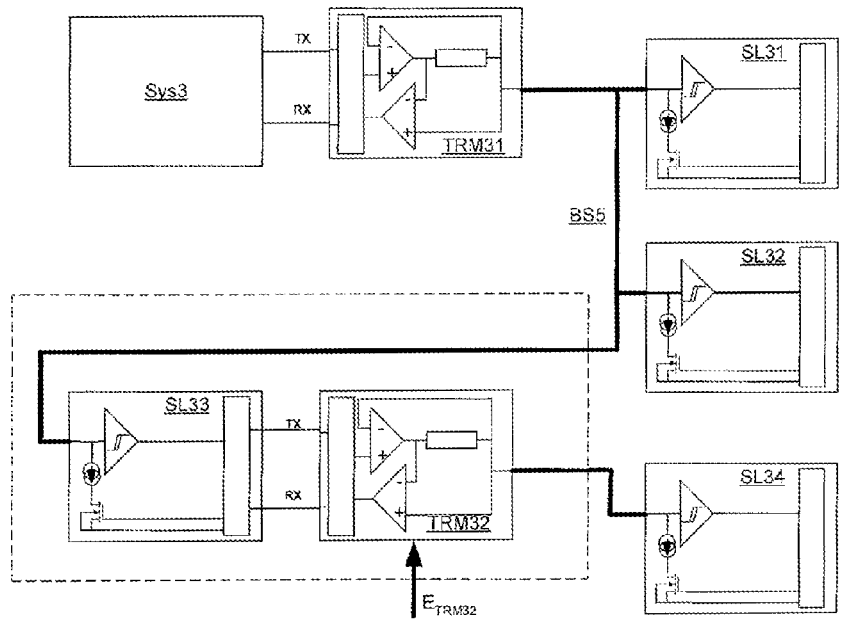
FIG. 31 is a diagrammatic representation of a third network variant, a "heterogeneous" network, including master and slave transmitters according to the first and second modes of realisation of the invention.

FIGS. 30 and 31 show mixed, i.e. with and without energy transport, master and slave transmitter circuits.

FIG. 30 is a diagrammatic representation of a mixed communication system including master and slave transmitters according to the first and second modes of realisation of the invention.

An electronic system Sys2 is connected to two master transmitters TRM21 and TRM22. The first master transmitter TRM21 complies with the first mode of realisation of the invention and is adapted for point to point communication on the bus BS4 with the slave transmitters SL21 and SL22. The second master transmitter TRM22 complies with the second mode of realisation of the invention. It is connected to an energy source ETRM22 and adapted for multipoint communication PTP with the slave transmitter SL23.

FIG. 31 is a diagrammatic representation of a third network variant, a "heterogeneous" network, including master and slave transmitters according to the first and second modes of realisation of the invention. An electronic system Sys3 is connected to a master transmitter TRM31. The initial master signal S1 is transmitted by the master transmitter TRM31 and propagated on a first bus BS5 connecting it to the slave transmitters SL31, SL32 and SL33. The slave transmitter SL33 is connected to a master transmitter TRM32 connected to an energy source $E_{TRM32}$. The master transmitter TRM32 is adapted for multipoint communication with a slave transmitter SL34.

Energy Savings

In the two modes of realisation with or without energy transport, it is possible to implement a method which allows the slave transmitter to wake up the master transmitter. To save energy, it may be useful to stop the transmission flow of the master signal S1. The master signal S1 includes a dynamic part, in fact, which generates energy consumption by loading and unloading the bus and by maintaining the logic encoding and decoding functions of the master signal S1. The transmitters can have three different states: active, standby, inactive.

Inactive state (initialisation) and active state (data and energy transfer) have already been described.

In standby state, the master transmitter supplies a master signal S1 at permanent logic state 1 (i.e. a master signal which does not include a transmission clock) used to power the slave transmitter in the mode of realisation with energy transport. To switch the master transmitter from standby to active state, the slave transmitter (or one of the slave transmitters for a networked system) simply has to consume current. The consumption of this current digitised by the master transmitter as a logic 1 state switches the master transmitter into active state.

The logic states corresponding to standby and active are purely conventional. Obviously, these logic states can be inverted.

Advantages

The transmitters according to the first mode of realisation without energy transport and the second mode of realisation with energy transport share the following advantages.

The invention allows full duplex data transmission and the transmission of synchronisation signals on a single active wire. Firstly, this characteristic is especially advantageous for the flexible systems, with significant cost constraints, and even for some situations where there is no alternative but the use of a communication technique on several wires. Secondly, the number of connection wires has a direct impact on the reliability of a solution as well as the cost of the connectors. Operation may be unpredictable in the event of bad contacts on part of a multipoint connector, resulting in malfunctions. This risk is reduced with the single wire communication device of the invention.

The master transmitter transmits data to the slave addresses via an output stage of very low impedance (a few ohms). This type of output stage efficiently controls a transmission line, even if the line has high capacitance. The transmission speeds theoretically possible with this type of transmission are therefore much greater than those of other systems using high impedance asymmetric amplifiers (e.g. I$^2$C, Bus J1850). The current peaks appear mainly during the transitions of the master signal S1 (voltage) and are due to the line capacitances. The slave signal S2 (current) is measured outside the transient phases of the master signal S1, resulting in good immunity to noise.

With the invention, it is easy to implement a bus repeater and to produce gateways.

The transmitters according to the first mode of realisation without energy transport offer the following specific advantages.

A multipoint network can be produced with this mode. In addition, bus management techniques without contention and general message broadcasting are possible. As regards performance, it is easy to implement.

The transmitters according to the second mode of realisation with energy transport offer the following specific advantages.

With this mode, it is easy to produce a point to point link only, although a multipoint link is not impossible if the sum of the polarisation currents of all slave transmitters on the bus is less than ILL.

A single wire can be used to transmit data and energy. This may result in practical advantages for the design of the integrated circuit which receives several energy sources, some of which can be stopped and the power supply contact short circuited. It is easy to produce wells in the integrated circuit which globally manages the power supply and the transmission.

Final Remarks

The above detailed description referring to the Figures illustrates a two-way digital communication device with the following characteristics.

A two-way digital communication device has a master transmitter (SysM1, TRM1, SysM2, TRM2) connected to at least one slave transmitter (SysS1, TRS1, SysS2, TRS2) by an active connection wire. The master transmitter and the slave transmitter have a common reference (GND). The master transmitter can transmit a master signal (S1) to the slave transmitter and the slave transmitter can transmit a slave signal (S2) to the master transmitter. The master signal (S1) is a digital modulation in voltage. The slave signal (S2) is a digital modulation in current.

According to another aspect of the invention, the two-way digital communication device includes the following optional characteristics.

The master transmitter (SysM1, TRM1, SysM2, TRM2) includes:
  a low impedance voltage loop (OB) through which the master signal (S1) is transmitted, the master signal (S1) comprising a transmission clock and data, and
  digitisation means (STM, DM, R$_{cs}$) to digitise two discrete values of the slave signal (S2), interpreted as binary values 0 or 1 (the digitisation means include a circuit to measure the current consumed by the slave transmitter).

The slave transmitter (SysS1, TRS1, SysS2, TRS2) includes:
  a current loop (IB) through which the slave signal (S2) is transmitted, the slave signal (S2) comprising data and being synchronised by the master signal (S1), and
  means to receive the master signal (S1) and means (DEC1, DEC2) to extract the data and the transmission clock of the master signal (S1).

According to a first mode of realisation of the invention, without energy transfer, the master transmitter (SysM1, TRM1, SysM2, TRM2) and the slave transmitter (SysS1, TRS1, SysS2, TRS2) are connected to a power supply (En).

According to a second mode of realisation of the invention, with energy transfer, only the master transmitter (SysM1, TRM1, SysM2, TRM2) is connected to a power supply (En). The master transmitter transmits a polarised master signal (S1) to the slave transmitter (SysS1, TRS1, SysS2, TRS2), the polarised master signal (S1) being a digital modulation in voltage which comprises a transmission clock, data and a polarisation voltage (energy polarisation).

The above detailed description referring to the Figures also illustrates a two-way digital communication method with the following characteristics. The method for two-way communication between a master transmitter (SysM1, TRM1, SysM2, TRM2) and at least one slave transmitter (SysS1, TRS1, SysS2, TRS2) connected by an active connection wire, includes a step to transmit the master signal (S1), the master signal (S1) being a digital modulation in voltage (comprising a transmission clock and data) and a step to transmit a slave signal (S2), the slave signal (S2) being a digital modulation in current (comprising data).

According to another mode of realisation of the invention, with energy transport, the method also includes a step to polarise the master signal (S1) before the step to transmit the master signal (S1), the resulting master signal (S1) comprising a transmission clock, data and a polarisation voltage (energy polarisation).

According to another aspect of the invention, the two-way digital communication method includes the following characteristics.

The slave signal (S2) is synchronised by the master signal (S1).

The method includes an additional step to digitise two discrete values of the slave signal (S2), interpreted as binary values logic 0 or 1, and a step to extract the data and the transmission clock from the master signal (S1) received.

According to another aspect of the invention, the digitisation step consists in interpreting as binary values logic 0 or 1 the current consumed by the (at least one) slave transmitter (SysS1, TRS1, SysS2, TRS2).

According to another aspect of the invention, the two-way digital communication method includes the following optional characteristics.

The modulation of the master signal (S1) is Pulse Width Modulation (PWM) type defining a binary code, a logic 1 and a logic 0 being identified by two separate cyclic ratios. By convention, logic 0 is identified by a cyclic ratio of 3/4 of a bit transmitted and logic 1 is identified by a cyclic ratio of 1/4 of a bit transmitted.

Advantageously, the identification of each logic value contained in the master signal (S1) consists in measuring the cyclic ratio of the master signal (S1) by a count up/count down step using an asynchronous clock of the transmission clock and of frequency at least four times greater.

More specifically, the identification of the logic value of the master signal (S1) is related to the sign of the counting value.

According to yet another aspect of the invention, the two-way digital communication method includes the following optional characteristics.

Absence during a given period of the clock signal of the master signal (S1) is interpreted by the slave transmitter as being a reset signal. Alternatively, absence during a given period of the polarisation or the clock signal of the master signal (S1) is interpreted by the slave transmitter as being a reset signal.

Transmission by the master transmitter of a master signal (S1) at a permanent state 1 not including a transmission clock defines a standby state. Consumption by the slave transmitter of a current digitised by the master transmitter as a logic 1 is interpreted by the master transmitter as a transition from standby state to active state.

The figures and their descriptions given above represent non-limiting illustrations of the invention. The reference signs in the claims are not limiting. The verbs "comprise" and "include" do not exclude the presence of elements other than those listed in the claims. The words "one"/"a" preceding an element do not exclude the presence of more than one of these elements.

The two modes of realisation of the invention have been illustrated by examples of functional realisation. Numerous other technical implementations are possible to satisfy the functions required by the invention. For example, other solutions can be implemented to detect the current consumed by the slave transmitter or to transmit signals with a low output impedance.

Lastly, those skilled in the art also know that other functions must be added in order to protect the electronic circuit against electrostatic discharges (ESD), excess current and voltage, and take measures to prevent dispersions of the manufacturing methods, etc. These protections and measures have not been described since they are not the subject of the invention and would simply have made the description of the invention more complicated.

The invention claimed is:

1. A two-way communication system including a master system and at least one slave system wherein:
the master system comprises a master transmitter having a common reference connection and an input/output,
the slave system comprises a slave transmitter having a common reference connection and an input/output, the common reference connection being connected to common reference connection of the master transmitter and the input/output being connected to the input/output of the master transmitter,
the master transmitter, in active state, transmits a master signal to the slave transmitter, the master signal being a digital modulation in voltage, in standby state, transmits a constant logic state to the slave transmitter, and while in standby state is operable to detect a current consumption by the slave transmitter and upon detecting such current consumption operable to switch from standby state to active state,
the slave transmitter operable to signal the master transmitter to switch to active state by consuming current and transmitting a slave signal to the master transmitter, the slave signal being a digital modulation in current,
and wherein a generic bit frame is used for communication between the master transmitter and the slave transmitter, said bit frame starting with a start flag comprising six consecutive bits at logic one, and, in the bit frame, a logic zero is inserted on transmission each time there are 5 consecutive bits at logic one.

2. The two-way digital communication system according to claim 1, wherein:
a) the master transmitter includes:
a low impedance voltage loop through which the master signal is transmitted, the master signal comprising a transmission clock and data,
digitisation means to digitise two discrete values of the slave signal, interpreted as binary values 0 or 1,
b) the, at least one, slave transmitter includes:
a current loop through which the slave signal is transmitted, the slave signal comprising data and being synchronised by the master signal, and
means to receive the master signal and means to extract the data and the transmission clock from the master signal.

3. The two-way communication system according to claim 1, wherein only the master transmitter is connected to a power supply, the master transmitter transmitting a polarised master signal to the slave transmitter, the polarised master signal being a digital modulation in voltage which comprises a transmission clock, data and a polarisation voltage wherein the polarized master signal provides energy to the slave system when the voltage exceeds a threshold and provides data to the slave when the voltage varies between the threshold and a second voltage level thereby providing energy and data simultaneously to the slave system.

4. The two-way communication system according to claim 3 wherein the slave system further comprises means to extract a power supply voltage from the received polarized master signal.

5. The two-way communication system according to claim 1, wherein at least two slave transmitters and a master transmitter are connected to a communication bus.

6. The two-way communication system according to claim 1, wherein the digital modulation in voltage is a Pulse Width Modulation using only two voltages levels.

7. The two-way communication system according to claim 1, wherein the bit frame comprises also an end flag with six consecutive bits at logic one.

8. A method for two-way communication between a master system including a master transmitter and at least one slave system including a slave transmitter connected by an active connection wire, the master transmitter and the slave transmitter having a common reference, the master transmitter being able to transmit a master signal to the slave transmitter and the slave transmitter being able to transmit a slave signal to the master transmitter, wherein the method comprises:

operating the master transmitter, in active state, to cause the master signal to be a digital modulation in voltage, and in standby state, to cause the master signal to be a constant logic state, to detect a current consumption by the slave transmitter and upon detecting such current consumption operable to switch from standby state to active state, operating the slave transmitter to signal the master transmitter to switch to active state by consuming current, and to cause the slave signal to be a digital modulation in current, and operating each of the master and slave transmitter to use a generic bit frame for communication between the master transmitter and the slave transmitter, said bit frame starting with a start flag comprising six consecutive bits at logic one, and, in the bit frame, a logic zero is inserted on transmission each time there are 5 consecutive bits at logic one.

9. The method according to claim 8, wherein:
the master signal comprises a transmission clock and data,
the slave signal comprises data and is synchronised by the master signal.

10. The method according to claim 9, wherein absence during a given period of the clock signal of the master signal is interpreted by the slave transmitter as being a reset signal.

11. The method according to claim 8, wherein the method -further comprises a step to polarise the master signal before the step to transmit the master signal, the resulting master signal being a digital modulation in voltage which comprises a transmission clock, data and a polarisation voltage wherein the master signal is polarized to provide energy to the slave system when the voltage exceeds a threshold and provide data to the slave when the voltage varies between the threshold and a second voltage level thereby providing energy and data simultaneously to the slave system.

12. The method according to claim 11, wherein absence during a given period of the polarisation or of the clock signal of the master signal is interpreted by the slave transmitter as being a reset signal.

13. The method according to claim 11 further comprising a step to extract power supply voltage from the master signal to provide energy for the slave system.

14. The method according to claim 8, wherein the modulation of the master signal is Pulse Width Modulation type defining a binary code, a logic 1 and a logic 0 being identified by two separate cyclic ratios.

15. The method according to claim 14, wherein the logic 0 is identified by a cyclic ratio of 3/4 of a bit transmitted and logic 1 is identified by a cyclic ratio of 1/4 of a bit transmitted.

16. The method according to claim 8, wherein the period of the master signal is variable.

17. The method according to claim 8, wherein transmission by the master transmitter of a master signal not including a transmission clock defines a standby state.

18. The method according to claim 8, wherein the bit frame comprises also an end flag with six consecutive bits at logic one.

19. A master system comprising:
a transmitter having a common reference connection and an input/output,
the common reference connection being intended to be connected to a common reference connection of a slave transmitter and the input/output being intended to be connected to an input/output of the slave transmitter, the master transmitter being capable of, in active state, transmitting a master signal to the slave transmitter, the master signal being a digital modulation in voltage, and the master transmitter being capable of receiving a slave signal from the slave transmitter, the slave signal being a digital modulation in current, and in standby state, transmitting a constant logic state to the slave transmitter, and while in standby state is operable to detect a current consumption by the slave transmitter and upon detecting such current consumption operable to switch from standby state to active state, and wherein a generic bit frame is used for communication between the master transmitter and the slave transmitter, said bit frame starting with a start flag comprising six consecutive bits at logic one, and, in the frame, a logic zero is inserted on transmission each time there are 5 consecutive bits at logic one.

20. The master system according to claim 19, wherein the master transmitter includes:
a low impedance voltage loop through which the master signal is transmitted, the master signal comprising a transmission clock and data,
digitisation means to digitise two discrete values of the slave signal, interpreted as binary values 0 or 1.

21. The master system according to claim 19, wherein the master transmitter transmitting a polarised master signal to the slave transmitter, the polarised master signal being a digital modulation in voltage which comprises a transmission clock, data and a polarisation voltage wherein the polarized master signal provides energy to the slave system when the voltage exceeds a threshold (and provides data to the slave when the voltage varies between the threshold and a second voltage level thereby providing energy and data simultaneously to the slave system.

22. The master system according to claim 21 connected to a slave system comprising means to extract a power supply voltage from the received polarized master signal.

23. The master system according to claim 19, wherein the digital modulation in voltage is a Pulse Width Modulation using only two voltages levels.

24. The master system according to claim 19, wherein the bit frame comprises also an end flag with six consecutive bits at logic one.

25. A slave system comprising:
a slave transmitter having a common reference connection and an input/output, the common reference connection being intended to be connected to a common reference connection of a master transmitter and the input/output being intended to be connected to an input/output of the master transmitter, the slave transmitter is capable of receiving a master signal from the master transmitter, the master signal being a digital modulation in voltage, the slave transmitter being capable of transmitting a slave signal to the master transmitter, the slave signal being a digital modulation in current, and is capable of signalling the master transmitter to switch to active state by consuming current, and wherein a generic bit frame is used for communication between the master transmitter and the slave transmitter, said bit frame starting with a start flag comprising six consecutive bits at logic one, and, in the frame, a logic zero is inserted on transmission each time there are 5 consecutive bits at logic one.

26. The slave system according to claim 25, wherein the slave transmitter includes:
a current loop (IB) through which the slave signal is transmitted, the slave signal comprising data and being synchronised by the master signal, and
means to receive the master signal and means to extract the data and the transmission clock from the master signal.

27. The slave system according to claim 26 wherein the means to receive the master signal further comprises means to extract power supply from the master signal thereby obtaining energy and data simultaneously.

28. The slave system according to claim 25, wherein the digital modulation in voltage is a Pulse Width Modulation using only two voltages levels.

29. The slave system according to claim 25, wherein the bit frame comprises also an end flag with six consecutive bits at logic one.

* * * * *